United States Patent
Tsuboi et al.

(10) Patent No.: US 12,513,771 B2
(45) Date of Patent: Dec. 30, 2025

(54) TERMINAL APPARATUS AND METHOD FOR PERFORMING RANDOM ACCESS PROCEDURES IN CARRIER AGGREGATION (CA) BASED NETWORKS

(71) Applicant: SHARP KABUSHIKI KAISHA, Sakai (JP)

(72) Inventors: Hidekazu Tsuboi, Sakai (JP); Shohei Yamada, Sakai (JP); Takako Hori, Sakai (JP); Kyosuke Inoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 342 days.

(21) Appl. No.: 18/032,795

(22) PCT Filed: Oct. 19, 2021

(86) PCT No.: PCT/JP2021/038535
§ 371 (c)(1),
(2) Date: Apr. 19, 2023

(87) PCT Pub. No.: WO2022/085663
PCT Pub. Date: Apr. 28, 2022

(65) Prior Publication Data
US 2023/0413333 A1 Dec. 21, 2023

(30) Foreign Application Priority Data
Oct. 21, 2020 (JP) ................................ 2020-176501

(51) Int. Cl.
*H04W 76/27* (2018.01)
*H04W 74/0833* (2024.01)
*H04W 74/0838* (2024.01)

(52) U.S. Cl.
CPC ....... *H04W 76/27* (2018.02); *H04W 74/0833* (2013.01); *H04W 74/0838* (2024.01)

(58) Field of Classification Search
CPC . H04W 74/0833; H04W 76/27; H04W 76/16; H04W 76/15; H04W 76/19; H04W 76/20; H04W 76/34; H04L 5/001; H04L 5/0035; H04L 5/0098
See application file for complete search history.

(56) References Cited

U.S. PATENT DOCUMENTS

| | | | |
|---|---|---|---|
| 2017/0374688 A1* | 12/2017 | Lee | H04W 76/27 |
| 2022/0141904 A1* | 5/2022 | Yilmaz | H04L 5/0035 370/329 |
| 2023/0189110 A1* | 6/2023 | Wu | H04W 36/185 370/331 |

OTHER PUBLICATIONS

WO_2020167170_A1 (Year: 2020).*
(Continued)

*Primary Examiner* — Rushil P. Sampat
(74) *Attorney, Agent, or Firm* — ScienBiziP, P.C.

(57) ABSTRACT

Provided is a method applied to a terminal apparatus for communicating with a base station apparatus. The method includes the steps of: receiving a first RRC message including a parameter related to a first cell group from the base station apparatus; and transmitting a random access preamble in an SpCell of the first cell group, based on reception of the first RRC message. The random access preamble is transmitted in the SpCell, based on first information being included in the first RRC message and a time alignment timer, in a primary TA group of the first cell group, which is not running.

2 Claims, 15 Drawing Sheets

(56) References Cited

OTHER PUBLICATIONS

3GPP TS 38.300 V16.2.0 (Jul. 2020) 3rd Generation Partnership Project; Technical Specification Group Radio Access Network; NR; NR and NG-RAN Overall Description; Stage 2 (Release 16).
3GPP TS 36.300 V16.2.0 (Jul. 2020) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).
3GPP TS 38.331 V16.2.0 (Sep. 2020) 3rd Generation Partnership Project; Technical Specification Group Radio Access Network; NR; Radio Resource Control (RRC) protocol specification (Release 16).
3GPP TS 36.331 V16.1.0 (Jul. 2020) 3rd Generation Partnership Project; Technical Specification Group Radio Access Network; Evolved Universal Terrestrial Radio Access (E-UTRA); Radio Resource Control (RRC); Protocol specification (Release 16).
3GPP TS 37.340 V16.2.0 (Jul. 2020) 3rd Generation Partnership Project; Technical Specification Group Radio Access Network; Evolved Universal Terrestrial Radio Access (E-UTRA) and NR; Multi-connectivity; Stage 2 (Release 16).
3GPP TS 38.321 V16.1.0 (Jul. 2020) 3rd Generation Partnership Project; Technical Specification Group Radio Access Network; NR; Medium Access Control (MAC) protocol specification (Release 16).
Huawei et al., "Security aspects of dual connectivity operation", R2-140509, 3GPP TSG-RAN WG2 Meeting #85, Prague, Czech Republic, Feb. 10-14, 2014.
Nokia et al., "Contention resolution for Connected mode UE", R2-1910619, 3GPP TSG-RAN WG2 Meeting #107 Prague, Czech Republic, Aug. 26-30, 2019.

* cited by examiner

```
RRCReconfiguration ::=        SEQUENCE {
  <PARTLY OMITTED>
  radioBearerConfig              RadioBearerConfig                                      OPTIONAL,   -- Need M
  secondaryCellGroup             OCTET STRING (CONTAINING CellGroupConfig)              OPTIONAL,   -- Need M
  masterCellGroup                OCTET STRING (CONTAINING CellGroupConfig)              OPTIONAL,   -- Need M
  mrdc-SecondaryCellGroupConfig  SetupRelease { MRDC-SecondaryCellGroupConfig }         OPTIONAL,   -- Need M
  <PARTLY OMITTED>
}

MRDC-SecondaryCellGroupConfig ::= SEQUENCE {
  mrdc-ReleaseAndAdd             ENUMERATED {true}                                      OPTIONAL,   -- Need N
  mrdc-SecondaryCellGroup        CHOICE {
    nr-SCG                         OCTET STRING (CONTAINING RRCReconfiguration),
    eutra-SCG                      OCTET STRING
  }
}

CellGroupConfig ::=            SEQUENCE {
  cellGroupId                    CellGroupId,
  <PARTLY OMITTED>
  mac-CellGroupConfig            MAC-CellGroupConfig                                    OPTIONAL,   -- Need M
  spCellConfig                   SpCellConfig                                           OPTIONAL,   -- Need M
  sCellToAddModList              SEQUENCE (SIZE (1..maxNrofSCells)) OF SCellConfig      OPTIONAL,   -- Need N
  sCellToReleaseList             SEQUENCE (SIZE (1..maxNrofSCells)) OF SCellIndex       OPTIONAL,   -- Need N
  <PARTLY OMITTED>
}
```

FIG. 7

```
RRCConnectionReconfiguration ::=     SEQUENCE {
    <PARTLY OMITTED>
    sCellToReleaseList-r10               SCellToReleaseList-r10     OPTIONAL,    -- Need ON
    sCellToAddModList-r10                SCellToAddModList-r10      OPTIONAL,    -- Need ON
    scg-Configuration-r12                SCG-Configuration-r12      OPTIONAL,    -- Cond HandoverConfig
    <PARTLY OMITTED>
}

PSCellToAddMod-r12 ::=     SEQUENCE {
    sCellIndex-r12                SCellIndex-r10,
    cellIdentification-r12        SEQUENCE {
        <PARTLY OMITTED>
    }
    OPTIONAL,        -- Cond SCellAdd
    <PARTLY OMITTED>
}

SCellToAddModList-r10 ::=     SEQUENCE (SIZE (1..maxSCell-r10)) OF SCellToAddMod-r10
SCellToAddMod-r10 ::=     SEQUENCE {
    sCellIndex-r10                SCellIndex-r10,
    cellIdentification-r10        SEQUENCE {
        <PARTLY OMITTED>
    }
    OPTIONAL,        -- Cond SCellAdd
    <PARTLY OMITTED>
}

SCG-Configuration-r12 ::=     CHOICE {
    release                              NULL,
    setup                                SEQUENCE {
        scg-ConfigPartSCG-r12                SCG-ConfigPartSCG-r12       OPTIONAL      -- Need ON
    }
}

SCG-ConfigPartSCG-r12 ::=     SEQUENCE {
    <PARTLY OMITTED>
    sCellToReleaseListSCG-r12            SCellToReleaseList-r10      OPTIONAL,     -- Need ON
    pSCellToAddMod-r12                   PSCellToAddMod-r12          OPTIONAL,     -- Need ON
    sCellToAddModListSCG-r12             SCellToAddModList-r10       OPTIONAL,     -- Need ON
    <PARTLY OMITTED>
}
```

FIG. 8

```
RRCReconfiguration ::=            SEQUENCE {
    rrc-TransactionIdentifier         RRC-TransactionIdentifier,
<PARTLY OMITTED>
    radioBearerConfig                                                 OPTIONAL,   -- Need M
    secondaryCellGroup                OCTET STRING (CONTAINING CellGroupConfig)   OPTIONAL,   -- Cond SCG
    masterCellGroup                   OCTET STRING (CONTAINING CellGroupConfig)   OPTIONAL,   -- Need M
    mrdc-SecondaryCellGroupConfig     SetupRelease { MRDC-SecondaryCellGroupConfig }   OPTIONAL,   -- Need M
<PARTLY OMITTED>
}
```

FIG. 9

```
CellGroupConfig ::=          SEQUENCE {
    cellGroupId                  CellGroupId,
    rlc-BearerToAddModList       SEQUENCE (SIZE(1..maxLC-ID)) OF RLC-BearerConfig        OPTIONAL,    -- Need N
    rlc-BearerToReleaseList      SEQUENCE (SIZE(1..maxLC-ID)) OF LogicalChannelIdentity  OPTIONAL,    -- Need N
    mac-CellGroupConfig          MAC-CellGroupConfig                                     OPTIONAL,    -- Need M
    physicalCellGroupConfig      PhysicalCellGroupConfig                                 OPTIONAL,    -- Need M
    spCellConfig                 SpCellConfig                                            OPTIONAL,    -- Need M
    sCellToAddModList            SEQUENCE (SIZE (1..maxNrofSCells)) OF SCellConfig       OPTIONAL,    -- Need N
    sCellToReleaseList           SEQUENCE (SIZE (1..maxNrofSCells)) OF SCellIndex        OPTIONAL,    -- Need N
    <PARTLY OMITTED>
}
```

FIG. 10

```
SpCellConfig ::=              SEQUENCE {
    servCellIndex                 ServCellIndex
    reconfigurationWithSync       ReconfigurationWithSync            OPTIONAL,  -- Cond SCG
    rlf-TimersAndConstants        SetupRelease { RLF-TimersAndConstants }  OPTIONAL,  -- Cond ReconfWithSync
    spCellConfigDedicated         ServingCellConfig                  OPTIONAL,  -- Need M
    <PARTLY OMITTED>                                                 OPTIONAL,  -- Need M
}
```

FIG. 11

```
ReconfigurationWithSync ::=    SEQUENCE {
    spCellConfigCommon              ServingCellConfigCommon                             OPTIONAL,   -- Need M
    newUE-Identity                  RNTI-Value,
    t304                            ENUMERATED {ms50, ms100, ms150, ms200, ms500, ms1000, ms2000, ms10000},
    rach-ConfigDedicated            CHOICE {
        uplink                          RACH-ConfigDedicated,
        supplementaryUplink             RACH-ConfigDedicated
    }                                                                                   OPTIONAL,   -- Need N
    <PARTLY OMITTED>
}
```

FIG. 12

```
ServingCellConfigCommon ::=    SEQUENCE {
    physCellId                     PhysCellId                                OPTIONAL,    -- Cond HOAndServCellAdd.
    downlinkConfigCommon           DownlinkConfigCommon                      OPTIONAL,    -- Cond HOAndServCellAdd
    uplinkConfigCommon             UplinkConfigCommon                        OPTIONAL,    -- Need M
    ssb-PositionsInBurst           CHOICE {
        shortBitmap                    BIT STRING (SIZE (4)),
        mediumBitmap                   BIT STRING (SIZE (8)),
        longBitmap                     BIT STRING (SIZE (64))
    }                                                                        OPTIONAL,    -- Cond AbsFreqSSB
    ssbSubcarrierSpacing           SubcarrierSpacing                         OPTIONAL,    -- Cond HOAndServCellWithSSB
    <PARTLY OMITTED>
}

DownlinkConfigCommon ::=       SEQUENCE {
    frequencyInfoDL                FrequencyInfoDL                           OPTIONAL,    -- Cond InterFreqHOAndServCellAdd
    initialDownlinkBWP             BWP-DownlinkCommon                        OPTIONAL,    -- Cond ServCellAdd
    <PARTLY OMITTED>
}
```

FIG. 13

```
SCellConfig ::=         SEQUENCE {
    sCellIndex              SCellIndex,
    sCellConfigCommon       ServingCellConfigCommon     OPTIONAL,   -- Cond SCellAdd
    sCellConfigDedicated    ServingCellConfig           OPTIONAL,   -- Cond SCellAddMod
    sCellState-r16          ENUMERATED {activated}      OPTIONAL,   -- Cond SCellAddSync
    <PARTLY OMITTED>
}
```

FIG. 14

TERMINAL APPARATUS AND METHOD FOR PERFORMING RANDOM ACCESS PROCEDURES IN CARRIER AGGREGATION (CA) BASED NETWORKS

TECHNICAL FIELD

The present invention relates to a method and an integrated circuit.

This application claims priority to JP 2020-176501 filed on Oct. 21, 2020, the contents of which are incorporated herein by reference.

BACKGROUND ART

In the 3rd Generation Partnership Project (3GPP) being a standardization project for cellular mobile communication systems, technical study and standardization have been carried out regarding the cellular mobile communication systems including radio access, core networks, services, and the like.

For example, in the 3GPP, technical study and standardization have been started on Evolved UniversaL TErrestrial Radio Access (E-UTRA) as a radio access technology (RAT) for cellular mobile communication systems for the 3.9th generation and the fourth generation. At present as well, in the 3GPP, technical study and standardization have been carried out on enhanced technology of E-UTRA. Note that E-UTRA may also be referred to as Long Term Evolution (LTE: trade name), and its enhanced technology may also be referred to as LTE-Advanced (LTE-A) and LTE-Advanced Pro (LTE-A Pro).

In the 3GPP, technical study and standardization have been started on New Radio or NR Radio access (NR) as a radio access technology (RAT) for cellular mobile communication systems for the fifth generation (5G). At present as well, in the 3GPP, technical study and standardization have been carried out on enhanced technology of NR.

CITATION LIST

Non Patent Literature

NPL 1: 3GPP TS 38.300v 16.2.0, "NR; NR and NG-RAN Overall description; Stage 2" pp. 10-134

NPL 2: 3GPP TS 36.300 v16.2.0, "Evolved Universal Terrestrial Radio Access (E-UTRA) and Evolved Universal Terrestrial Radio Access Network (E-UTRAN); Overall description; Stage 2" pp. 19-361

NPL 3: 3GPP TS 38.331 v16.2.0, "NR: Radio Resource Control (RRC); Protocol specifications" pp. 21-861

NPL 4: 3GPP TS 36.331 v16.1.0, "Evolved Universal Terrestrial Radio Access (E-UTRA); Radio Resource Control (RRC); Protocol specifications" pp. 25-1012

NPL 5: 3GPP TS 37.340 v16.2.0, "Evolved Universal Terrestrial Radio Access (E-UTRA) and NR; Multi-Connectivity; Stage 2" pp. 6-67

NPL 6: 3GPP TS 38.321 v16.1.0, "NR; Medium Access Control (MAC) protocol specification" pp. 8-148

SUMMARY OF INVENTION

Technical Problem

As an enhanced technology of NR, in order to enable data communication of large capacity, there is a dual connectivity (also referred to as multi-connectivity) technology, in which one or multiple base station apparatuses and a terminal apparatus communicate with each other using multiple cell groups. In dual connectivity, in order to perform communication in each of the cell groups, the terminal apparatus needs to monitor whether or not there is a message addressed to the terminal apparatus itself in each of the cell groups. There is a problem in that the terminal apparatus needs to constantly perform monitoring of multiple cell groups so as to be able to communicate with low delay in a case that data communication of large capacity occurs, and accordingly consumes much power. Thus, a technique (cell group Deactivation technique) of performing monitoring of a part of the cell groups at a low frequency or stopping the monitoring has been studied.

In addition to operation of the terminal apparatus in a deactivated state of the cell group, operation of the terminal apparatus in a case of activating (recovering) from the deactivated state needs to be studied as well.

An aspect of the present invention is made in view of the circumstances described above, and has an object to provide a method and an integrated circuit, with which communication control can be efficiently performed.

Solution to Problem

In order to accomplish the object described above, an aspect of the present invention is contrived to provide the following means. Specifically, an aspect of the present invention is a terminal apparatus for communicating with a base station apparatus. The terminal apparatus includes a receiver configured to receive a first RRC message including a parameter related to a first cell group from the base station apparatus, a processing unit, and a transmitter configured to transmit a random access preamble in an SpCell of the first cell group, based on reception of the first RRC message. The processing unit transmits the random access preamble in the SpCell, based on first information being included in the first RRC message and a time alignment timer, in a primary TA group of the first cell group, which is not running.

An aspect of the present invention is a base station apparatus for communicating with a terminal apparatus. The base station apparatus includes a transmitter configured to transmit a first RRC message including a parameter related to a first cell group to the terminal apparatus; and a receiver configured to receive a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

An aspect of the present invention is a method applied to a terminal apparatus for communicating with a base station apparatus. The method includes the steps of: receiving a first RRC message including a parameter related to a first cell group from the base station apparatus; and transmitting a random access preamble in an SpCell of the first cell group, based on reception of the first RRC message. The random access preamble is transmitted in the SpCell, based on first information being included in the first RRC message and a time alignment timer, in a primary TA group of the first cell group, which is not running.

An aspect of the present invention is a method applied to a base station apparatus for communicating with a terminal apparatus. The method includes the steps of: transmitting a first RRC message including a parameter related to a first cell group to the terminal apparatus; and receiving a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

An aspect of the present invention is an integrated circuit implemented in a terminal apparatus for communicating with a base station apparatus. The integrated circuit causes the terminal apparatus to perform: receiving a first RRC message including a parameter related to a first cell group from the base station apparatus; and transmitting a random access preamble in an SpCell of the first cell group, based on reception of the first RRC message. The random access preamble is transmitted in the SpCell, based on first information being included in the first RRC message and a time alignment timer, in a primary TA group of the first cell group, which is not running.

An aspect of the present invention is an integrated circuit implemented in a base station apparatus for communicating with a terminal apparatus. The integrated circuit causes the base station apparatus to perform: transmitting a first RRC message including a parameter related to a first cell group to the terminal apparatus; and receiving a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the base station apparatus, the method, and the integrated circuit can implement efficient communication control processing.

BRIEF DESCRIPTION OF DRAWINGS

FIG. 7 is an example of an ASN.1 notation included in a message related to reconfiguration of RRC connection in NR according to an embodiment of the present invention.

FIG. 8 is an example of an ASN.1 notation included in a message related to reconfiguration of RRC connection in E-UTRA according to an embodiment of the present invention.

FIG. 9 is an example of an ASN.1 notation of an RRC reconfiguration message according to an embodiment of the present invention.

FIG. 10 is an example of an ASN.1 notation of a cell group configuration information element according to an embodiment of the present invention.

FIG. 11 is an example of an ASN.1 notation of a configuration of an SpCell according to an embodiment of the present invention.

FIG. 12 is an example of an ASN.1 notation of a reconfiguration information element with synchronization according to an embodiment of the present invention.

FIG. 13 is an example of an ASN.1 notation of a ServingCellConfigCommon information element according to an embodiment of the present invention.

FIG. 14 is an example of an ASN.1 notation of an SCell configuration information element according to an embodiment of the present invention.

DESCRIPTION OF EMBODIMENTS

Hereinafter, an embodiment of the present invention will be described in detail with reference to the drawings.

LTE (and LTE-A, LTE-A Pro) and NR may be defined as different Radio Access Technologies (RATs). NR may be defined as a technology included in LTE. LTE may be defined as a technology included in NR. LTE that is connectible to NR by using Multi Radio Dual connectivity (MR-DC) may be distinguished from existing LTE. LTE using a 5GC as a core network may be distinguished from existing LTE using an EPC as a core network. Note that existing LTE may refer to LTE in which a technology standardized in release 15 or later versions of 3GPP is not implemented. An embodiment of the present invention may be applied to NR, LTE, and other RATs. Terms associated with LTE and NR are used in the following description. However, an embodiment of the present invention may be applied to other technologies using other terms. In an embodiment of the present invention, the term "E-UTRA" may be replaced with "LTE," and the term "LTE" may be replaced with "E-UTRA."

Note that, in an embodiment of the present invention, terms of each node and entity, processing in each node and entity, and the like in a case that the radio access technology is E-UTRA or NR will be described. However, an embodiment of the present invention may be used for another radio access technology. The terms of each node and entity in an embodiment of the present invention may be other terms.

Figure 1:
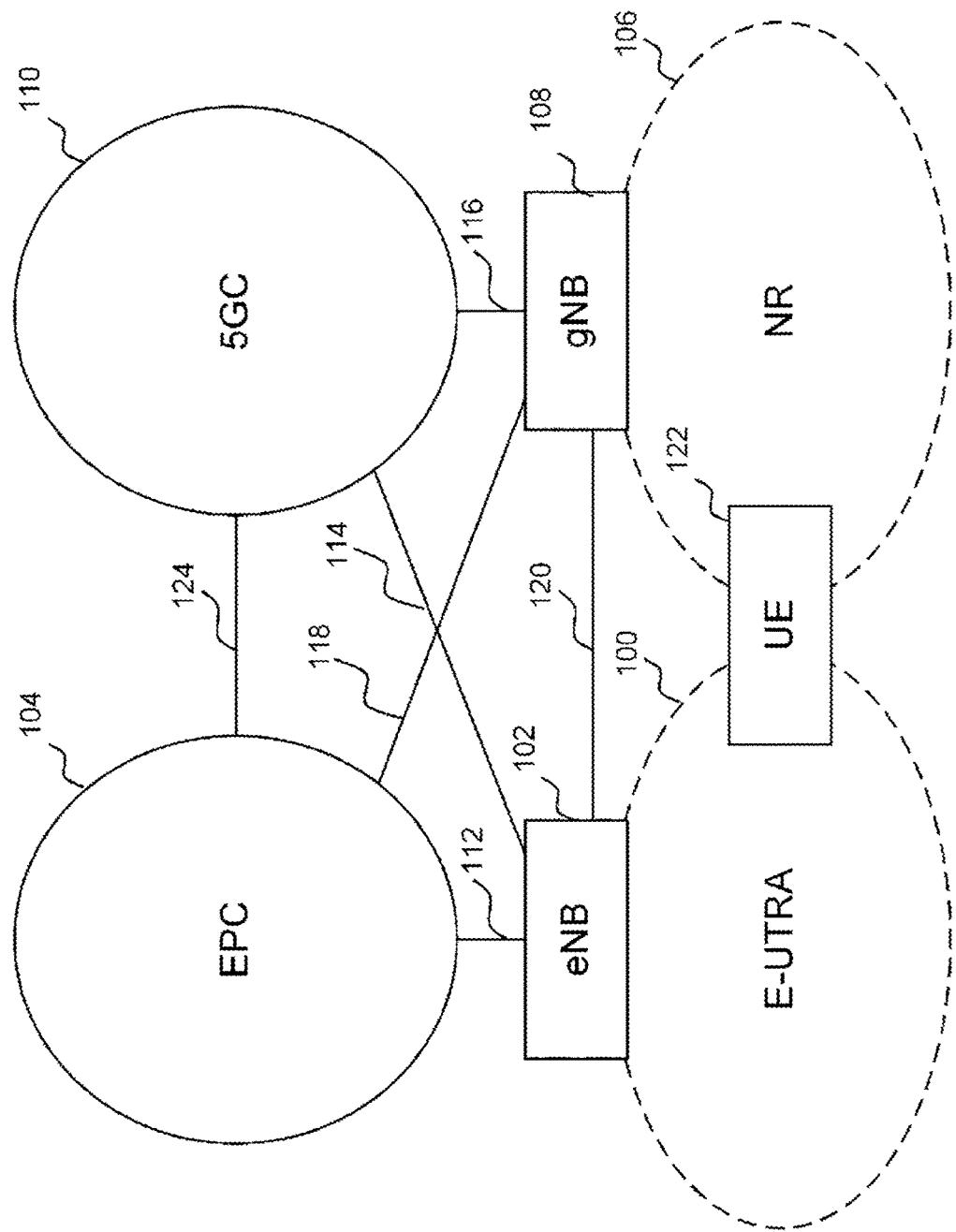
FIG. 1 is a schematic diagram of a communication system according to an embodiment of the present invention.

FIG. 1 is a schematic diagram of a communication system according to an embodiment of the present invention. Note that functions such as each node, radio access technology, core network, and interface to be described with reference to FIG. 1 are a part of functions closely related to an embodiment of the present invention, and other functions may be provided.

E-UTRA 100 may be a radio access technology. The E-UTRA 100 may be an air interface between a UE 122 and an eNB 102. The air interface between the UE 122 and the eNB 102 may be referred to as a Uu interface. The E-UTRAN Node B (eNB) 102 may be a base station apparatus of the E-UTRA 100. The eNB 102 may have an E-UTRA protocol to be described below. The E-UTRA protocol may include an E-UTRA User Plane (UP) protocol to be described below and an E-UTRA Control Plane (CP) protocol to be described below. The eNB 102 may terminate the E-UTRA User Plane (UP) protocol and the E-UTRA Control Plane (CP) protocol for the UE 122. A radio access network configured with the eNB may be referred to as an E-UTRAN.

An Evolved Packet Core (EPC) 104 may be a core network. An interface 112 is an interface between the eNB 102 and the EPC 104, and may be referred to as an S1 interface. The interface 112 may include a control plane interface through which a control signal passes and/or a user plane interface through which user data passes. The control plane interface of the interface 112 may be terminated in a Mobility Management Entity (MME) (not illustrated) in the EPC 104. The user plane interface of the interface 112 may be terminated in a serving gateway (S-GW) (not illustrated) in the EPC 104. The control plane interface of the interface 112 may be referred to as an S1-MME interface. The user plane interface of the interface 112 may be referred to as an S1-U interface.

Note that one or multiple eNBs 102 may be connected to the EPC 104 via the interface 112. Among the multiple eNBs 102 connected to the EPC 104, an interface may be present (not illustrated). The interface among the multiple eNBs 102 connected to the EPC 104 may be referred to as an X2 interface.

NR 106 may be a radio access technology. The NR 106 may be an air interface between the UE 122 and a gNB 108. The air interface between the UE 122 and the gNB 108 may be referred to as a Uu interface. The g Node B (gNB) 108 may be a base station apparatus of the NR 106. The gNB 108 may have an NR protocol to be described below. The NR protocol may include an NR User Plane (UP) protocol to be described below and an NR Control Plane (CP) protocol to be described below. The gNB 108 may terminate the NR User Plane (UP) protocol and the NR Control Plane (CP) protocol for the UE 122.

A 5GC 110 may be a core network. An interface 116 is an interface between the gNB 108 and the 5GC 110, and may be referred to as an NG interface. The interface 116 may include a control plane interface through which a control signal passes and/or a user plane interface through which user data passes. The control plane interface of the interface 116 may be terminated in an Access and mobility Management Function (AMF) (not illustrated) in the 5GC 110. The user plane interface of the interface 116 may be terminated in a User Plane Function (UPF) (not illustrated) in the 5GC 110. The control plane interface of the interface 116 may be referred to as an NG-C interface. The user plane interface of the interface 116 may be referred to as an NG-U interface.

Note that one or multiple gNBs 108 may be connected to the 5GC 110 via the interface 116. Among the multiple gNBs 108 connected to the 5GC 110, an interface may be present (not illustrated). The interface among the multiple gNBs 108 connected to the 5GC 110 may be referred to as an Xn interface.

The eNB 102 may have a function of connecting to the 5GC 110. The eNB 102 having the function of connecting to the 5GC 110 may be referred to as an ng-eNB. An interface 114 is an interface between the eNB 102 and the 5GC 110, and may be referred to as an NG interface. The interface 114 may include a control plane interface through which a control signal passes and/or a user plane interface through which user data passes. The control plane interface of the interface 114 may be terminated in an Access and mobility Management Function (AMF) (not illustrated) in the 5GC 110. The user plane interface of the interface 114 may be terminated in a User Plane Function (UPF) (not illustrated) in the 5GC 110. The control plane interface of the interface 114 may be referred to as an NG-C interface. The user plane interface of the interface 114 may be referred to as an NG-U interface. A radio access network including the ng-eNB or the gNB may be referred to as an NG-RAN. The NG-RAN, the E-UTRAN, the eNB, the ng-eNB, the gNB, and the like may be simply referred to as a network.

Note that one or multiple eNBs 102 may be connected to the 5GC 110 via the interface 114. Among the multiple eNBs 102 connected to the 5GC 110, an interface may be present (not illustrated). The interface among the multiple eNBs 102 connected to the 5GC 110 may be referred to as an Xn interface. The eNB 102 connected to the 5GC 110 and the gNB 108 connected to the 5GC 110 may be connected with an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated in an S-GW (not illustrated) in the EPC 104. The user plane interface of the interface 118 may be referred to as an S1-U interface. The eNB 102 connected to the EPC 104 and the gNB 108 connected to the EPC 104 may be connected with the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface that allows only the CP, only the UP, or both of the CP and the UP to pass therethrough. A part or all of the interfaces out of the interface 114, the interface 116, the interface 118, the interface 120, the interface 124, and the like may be absent depending on a communication system provided by a communication provider or the like.

The UE 122 may be a terminal apparatus that can receive broadcast information and a paging message transmitted from the eNB 102 and/or the gNB 108. The UE 122 may be a terminal apparatus that can perform radio connection with the eNB 102 and/or the gNB 108. The UE 122 may be a terminal apparatus that can simultaneously perform radio connection with the eNB 102 and radio connection with the gNB 108. The UE 122 may have the E-UTRA protocol and/or the NR protocol. Note that the radio connection may be Radio Resource Control (RRC) connection.

In a case that the UE 122 communicates with the eNB 102 and/or the gNB 108, Radio Bearers (RBs) may be established between the UE 122 and the eNB 102 and/or the gNB 108 to perform radio connection. The radio bearer used for the CP may be referred to as a Signalling Radio Bearer (SRB). The radio bearer used for the UP may be referred to as a data radio bearer (DRB Data Radio Bearer). Each radio bearer may be assigned a radio bearer identity (Identity) (ID). The radio bearer identity for the SRB may be referred to as an SRB identity (SRB Identity or SRB ID). The radio bearer identity for the DRB may be referred to as a DRB identity (DRB Identity or DRB ID).

The UE 122 may be a terminal apparatus that can connect to the EPC 104 and/or the 5GC 110 via the eNB 102 and/or the gNB 108. In a case that a connection destination core network of the eNB 102 and/or the gNB 108 with which the UE 122 performs communication is the EPC 104, each DRB established between the UE 122 and the eNB 102 and/or the gNB 108 may further be uniquely associated with each Evolved Packet System (EPS) bearer passing through the EPC 104. Each EPS bearer may be identified with an EPS bearer identity (Identity or ID). The same QoS may be secured for data, such as an IP packet and an Ethernet (trade name) frame, which passes through the same EPS bearer.

In a case that the connection destination core network of the eNB 102 and/or the gNB 108 with which the UE 122 performs communication is the 5GC 110, each DRB established between the UE 122 and the eNB 102 and/or the gNB 108 may further be associated with one of Packet Data Unit (PDU) sessions established in the 5GC 110. Each PDU session may include one or multiple QoS flows. Each DRB may be associated with (mapped to) one or multiple QoS flows, or may be associated with none of the QoS flows. Each PDU session may be identified with a PDU session Identifier (Identity, or ID). Each QoS flow may be identified with a QoS flow Identifier Identity, or ID). The QoS may be secured for data, such as an IP packet and an Ethernet frame, which passes through the same QoS flow.

The EPC 104 may not include the PDU session(s) and/or the QoS flow(s). The 5GC 110 may not include the EPS bearer(s). In a case that the UE 122 is connected to the EPC 104, the UE 122 may have information of the EPS bearer(s) but may not have information in the PDU session(s) and/or the QoS flow(s). In a case that the UE 122 is connected to the 5GC 110, the UE 122 may have information in the PDU session(s) and/or the QoS flow(s) but may not have information of the EPS bearer(s).

Note that, in the following description, the eNB 102 and/or the gNB 108 is also simply referred to as a base station apparatus, and the UE 122 is also simply referred to as a terminal apparatus or a UE.

Figure 2:
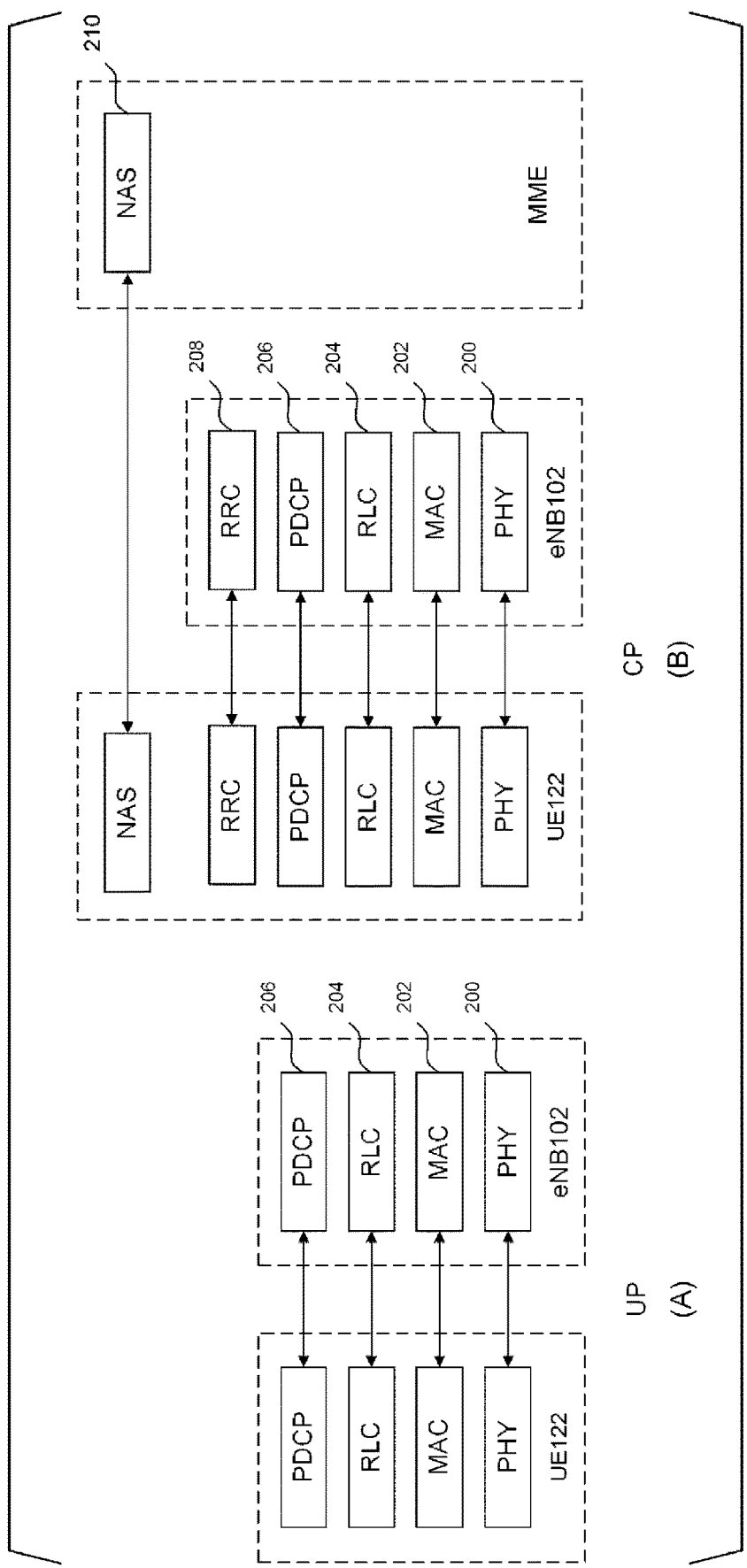
FIG. 2 is a diagram of an example of E-UTRA protocol architecture according to an embodiment of the present invention.
Figure 3:
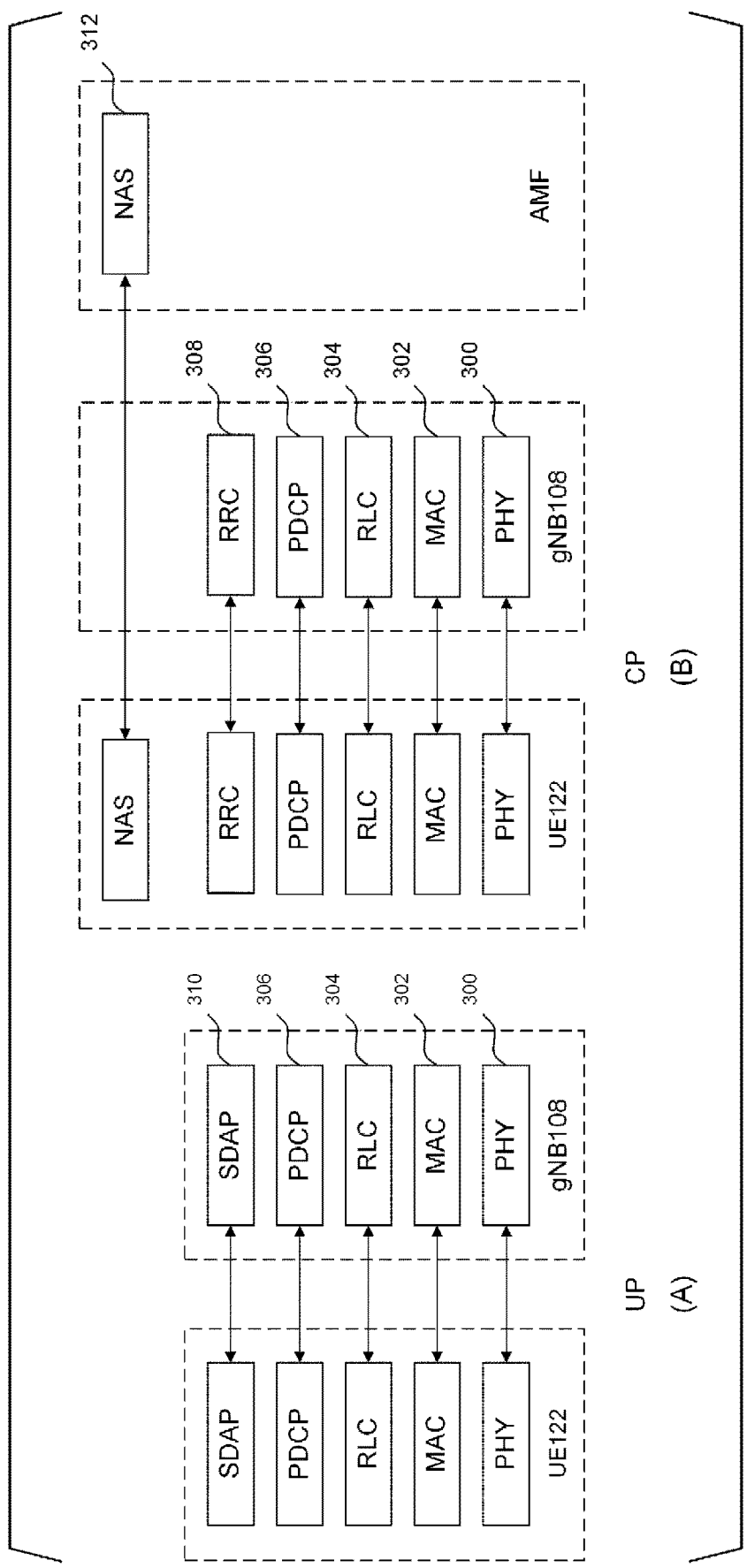
FIG. 3 is a diagram of an example of NR protocol architecture according to an embodiment of the present invention.

FIG. 2 is a diagram of an example of E-UTRA protocol architecture according to an embodiment of the present invention. FIG. 3 is a diagram of an example of NR protocol architecture according to an embodiment of the present invention. Note that functions of each protocol to be described with reference to FIG. 2 and/or FIG. 3 are a part of functions closely related to an embodiment of the present invention, and other functions may be provided. Note that, in an embodiment of the present invention, an uplink (UL) may be a link from the terminal apparatus to the base station apparatus. In each embodiment of the present invention, a downlink (DL) may be a link from the base station apparatus to the terminal apparatus.

FIG. 2(A) is a diagram of an E-UTRA user plane (UP) protocol stack. As illustrated in FIG. 2(A), the E-UTRAN UP protocol may be a protocol between the UE 122 and the eNB 102. In other words, the E-UTRAN UP protocol may be a protocol terminated in the eNB 102 in a network side. As illustrated in FIG. 2(A), the E-UTRA user plane protocol stack may include a Physical layer (PHY) 200 being a radio physical layer, a Medium Access Control (MAC) 202 being a medium access control layer, a Radio Link Control (RLC) 204 being a radio link control layer, and a Packet Data Convergence Protocol (PDCP) 206 being a packet data convergence protocol layer.

FIG. 3(A) is a diagram of an NR user plane (UP) protocol stack. As illustrated in FIG. 3(A), the NR UP protocol may be a protocol between the UE 122 and the gNB 108. In other words, the NR UP protocol may be a protocol terminated in the gNB 108 in a network side. As illustrated in FIG. 3(A), the E-UTRA user plane protocol stack may include a PHY 300 being a radio physical layer, a MAC 302 being a medium access control layer, an RLC 304 being a radio link control layer, a PDCP 306 being a packet data convergence protocol layer, and a service data adaptation protocol layer SDAP (Service Data Adaptation Protocol) 310.

FIG. 2(B) is a diagram of E-UTRA control plane (CP) protocol architecture. As illustrated in FIG. 2(B), in the E-UTRAN CP protocol, a Radio Resource Control (RRC) 208 being a radio resource control layer may be a protocol between the UE 122 and the eNB 102. In other words, the RRC 208 may be a protocol terminated in the eNB 102 in a network side. In the E-UTRAN CP protocol, a Non Access Stratum (NAS) 210 being a non Access Stratum (AS) layer (non AS layer) may be a protocol between the UE 122 and the MME. In other words, the NAS 210 may be a protocol terminated in the MME in a network side.

FIG. 3(B) is a diagram of NR control plane (CP) protocol architecture. As illustrated in FIG. 3(B), in the NR CP protocol, an RRC 308 being a radio resource control layer may be a protocol between the UE 122 and the gNB 108. In other words, the RRC 308 may be a protocol terminated in the gNB 108 in a network side. In the E-UTRAN CP protocol, a NAS 312 being a non AS layer may be a protocol between the UE 122 and the AMF. In other words, the NAS 312 may be a protocol terminated in the AMF in a network side.

Note that the Access Stratum (AS) layer may be a layer terminated between the UE 122 and the eNB 102 and/or the gNB 108. In other words, the AS layer may be a layer including a part or all of the PHY 200, the MAC 202, the RLC 204, the PDCP 206, and the RRC 208, and/or a layer including a part or all of the PHY 300, the MAC 302, the RLC 304, the PDCP 306, the SDAP 310, and the RRC 308.

Note that, in an embodiment of the present invention, terms such as a PHY (PHY layer), a MAC (MAC layer), an RLC (RLC layer), a PDCP (PDCP layer), an RRC (RRC layer), and a NAS (NAS layer) may be hereinafter used, without the protocol of E-UTRA and the protocol of NR being distinguished from each other. In this case, the PHY (PHY layer), the MAC (MAC layer), the RLC (RLC layer), the PDCP (PDCP layer), the RRC (RRC layer), and the NAS (NAS layer) may be the PHY (PHY layer), the MAC (MAC layer), the RLC (RLC layer), the PDCP (PDCP layer), the RRC (RRC layer), and the NAS (NAS layer) of the E-UTRA protocol, or may be the PHY (PHY layer), the MAC (MAC layer), the RLC (RLC layer), the PDCP (PDCP layer), the RRC (RRC layer), and the NAS (NAS layer) of the NR protocol, respectively. The SDAP (SDAP layer) may be the SDAP (SDAP layer) of the NR protocol.

In an embodiment of the present invention, in a case that the protocol of E-UTRA and the protocol of NR are distinguished from each other, the PHY 200, the MAC 202, the RLC 204, the PDCP 206, and the RRC 208 may be hereinafter referred to as the PHY for E-UTRA or the PHY for LTE, the MAC for E-UTRA or the MAC for LTE, the RLC for E-UTRA or the RLC for LTE, the PDCP for E-UTRA or the PDCP for LTE, and the RRC for E-UTRA or the RRC for LTE, respectively. The PHY 200, the MAC 202, the RLC 204, the PDCP 206, and the RRC 208 may be referred to as an E-UTRA PHY or an LTE PHY, an E-UTRA MAC or an LTE MAC, an E-UTRA RLC or an LTE RLC, an E-UTRA PDCP or an LTE PDCP, an E-UTRA RRC or an LTE RRC, and the like, respectively. In a case that the protocol of E-UTRA and the protocol of NR are distinguished from each other, the PHY 300, the MAC 302, the RLC 304, the PDCP 306, and the RRC 308 may be referred to as a PHY for NR, a MAC for NR, an RLC for NR, an RLC for NR, and an RRC for NR, respectively. The PHY 200, the MAC 302, the RLC 304, the PDCP 306, and the RRC 308 may be referred to as an NR PHY, an NR MAC, an NR RLC, an NR PDCP, an NR RRC, and the like, respectively.

Entities in the AS layer of E-UTRA and/or NR will be described. An entity having a part or all of functions of the MAC layer may be referred to as a MAC entity. An entity having a part or all of functions of the RLC layer may be referred to as an RLC entity. An entity having a part or all of functions of the PDCP layer may be referred to as a PDCP entity. An entity having a part or all of functions of the SDAP layer may be referred to as an SDAP entity. An entity having a part or all of functions of the RRC layer may be referred to as an RRC entity. The MAC entity, the RLC entity, the PDCP entity, the SDAP entity, and the RRC entity may be alternatively referred to as a MAC, an RLC, a PDCP, an SDAP, and an RRC, respectively.

Note that data provided from the MAC, the RLC, the PDCP, and the SDAP to a lower layer, and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. Data provided to the MAC, the RLC, the PDCP, and the SDAP from an upper layer, and/or data provided from the MAC, the RLC, the PDCP, and the SDAP to an upper layer may be referred to as a MAC Service Data Unit (SDU), an RLC SDU, a PDCP SDU, and an SDAP SDU, respectively. A segmented RLC SDU may be referred to as an RLC SDU segment.

An example of the functions of the PHY will be described. The PHY of the terminal apparatus may have a function of receiving data transmitted from the PHY of the base station apparatus via a Downlink (DL) Physical Channel. The PHY of the terminal apparatus may have a function of transmitting data to the PHY of the base station apparatus via an Uplink (UL) physical channel. The PHY may be connected to an upper MAC with a Transport Channel. The PHY may deliver data to the MAC via the transport channel. The PHY may be provided with data from the MAC via the transport channel. In the PHY, in order to identify various pieces of control information, a Radio Network Temporary Identifier (RNTI) may be used.

Now, the physical channels will be described.

The physical channels used for radio communication between the terminal apparatus and the base station apparatus may include the following physical channels.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH may be used to broadcast system information required by the terminal apparatus.

The PBCH may be used to broadcast time indexes (SSB-Indexes) within the periodicity of synchronization signal blocks (also referred to as SS/PBCH blocks, SSBs) in NR.

The PDCCH may be used to transmit (or carry) Downlink Control Information (DCI) in downlink radio communication (radio communication from the base station apparatus to the terminal apparatus). Here, one or multiple pieces of DCI (which may be referred to as DCI formats) may be defined for transmission of the downlink control information. In other words, a field for the downlink control information may be defined as DCI and may be mapped to information bits. The PDCCH may be transmitted in PDCCH candidates. The terminal apparatus may monitor a set of PDCCH candidates in a serving cell. To monitor a set of PDCCH candidates may mean an attempt to decode the PDCCH in accordance with a certain DCI format. The DCI format may be used for scheduling of the PUSCH in the serving cell. The PUSCH may be used for transmission of user data, transmission of RRC messages to be described below, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include a Scheduling Request (SR) used for requesting Uplink Shared CHannel (UL-SCH) resources. The uplink control information may include a Hybrid Automatic Repeat request ACKnowledgement (HARQ-ACK).

The PDSCH may be used to transmit downlink data (Downlink Shared CHannel (DL-SCH)) from the MAC layer. In a case of the downlink, the PDSCH may be used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used to transmit RRC signalling (also referred to as an RRC message) and a MAC control element. In this regard, in the PDSCH, the RRC signalling transmitted from the base station apparatus may be signalling common to multiple terminal apparatuses in a cell. The RRC signalling transmitted from the base station apparatus may be dedicated signalling for a certain terminal apparatus (also referred to as dedicated signalling). In other words, terminal apparatus-specific (UE-specific) information may be transmitted through dedicated signalling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

An example of the functions of the MAC will be described. The MAC may be referred to as a MAC sublayer.

The MAC may have a function of mapping various Logical Channels to their corresponding transport channels. The logical channel may be identified with a logical channel identifier (Logical Channel Identity or Logical Channel ID). The MAC may be connected to an upper RLC with a logical channel. The logical channel may be classified into a control channel for transmitting control information and a traffic channel for transmitting user information, depending on a type of information to be transmitted. The logical channel may be classified into an uplink logical channel and a downlink logical channel. The MAC may have a function of multiplexing MAC SDUs belonging to one or multiple different logical channels and providing the multiplexed MAC SDUs to the PHY. The MAC may have a function of demultiplexing the MAC PDUs provided from the PHY and providing the demultiplexed MAC PDUs to an upper layer via the logical channels to which the respective MAC SDUs belong.

The MAC may have a function of performing error correction through a Hybrid Automatic Repeat reQuest (HARQ). The MAC may have a Scheduling Report (SR) function of reporting scheduling information. The MAC may have a function of performing priority processing among the terminal apparatuses by using dynamic scheduling. The MAC may have a function of performing priority processing among the logical channels in one terminal apparatus. The MAC may have a function of performing priority processing of resources overlapping in one terminal apparatus.

The E-UTRA MAC may have a function of identifying Multimedia Broadcast Multicast Services (MBMS). The NR MAC may have a function of identifying a Multicast Broadcast Service (MBS).

The MAC may have a function of selecting a transport format. The MAC may have a function of performing Discontinuous Reception (DRX) and/or Discontinuous Transmission (DTX), a function of performing a Random Access (RA) procedure, a Power Headroom Report (PHR) function of reporting information of transmittable power, a Buffer Status Report (BSR) function of reporting data volume information of a transmission buffer, and the like.

The NR MAC may have a Bandwidth Adaptation (BA) function. A MAC PDU format used in the E-UTRA MAC and a MAC PDU format used in the NR MAC may be different from each other. The MAC PDU may include a MAC control element (MAC CE) being an element for performing control in the MAC.

Uplink (UL) and/or Downlink (DL) logical channels used in E-UTRA and/or NR will be described.

A Broadcast Control Channel (BCCH) may be a downlink logical channel for broadcasting control information, such as System Information (SI).

A Paging Control Channel (PCCH) may be a downlink logical channel for carrying a Paging message.

A Common Control Channel (CCCH) may be a logical channel for transmitting control information between the terminal apparatus and the base station apparatus. The CCCH may be used in a case that the terminal apparatus does not have RRC connection. The CCCH may be used between the base station apparatus and multiple terminal apparatuses.

A Dedicated Control Channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has RRC connection.

A Dedicated Traffic Channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both of the uplink and the downlink.

A Multicast Traffic Channel (MTCH) may be a point-to-multipoint downlink channel for transmitting data from the base station apparatus to the terminal apparatus. The MTCH may be a logical channel for multicasting. The MTCH may be used by the terminal apparatus only in a case that the terminal apparatus receives MBMS.

A Multicast Control Channel (MCCH) may be a point-to-multipoint downlink channel for transmitting MBMS control information for one or multiple MTCHs from the base station apparatus to the terminal apparatus. The MCCH may be a logical channel for multicasting. The MCCH may be used by the terminal apparatus only in a case that the terminal apparatus receives MBMS or the terminal apparatus is interested in receiving MBMS.

A Single Cell Multicast Traffic Channel (SC-MTCH) may be a point-to-multipoint downlink channel for transmitting data by using SC-PTM from the base station apparatus to the terminal apparatus. The SC-MTCH may be a logical channel for multicasting. The SC-MTCH may be used by the terminal apparatus only in a case that the terminal apparatus receives MBMS by using Single Cell Point-To-Multipoint (SC-PTM).

A Single Cell Multicast Control Channel (SC-MCCH) may be a point-to-multipoint downlink channel for transmitting MBMS control information for one or multiple SC-MTCHs from the base station apparatus to the terminal apparatus. The SC-MCCH may be a logical channel for multicasting. The SC-MCCH may be used by the terminal apparatus only in a case that the terminal apparatus receives MBMS by using SC-PTM or the terminal apparatus is interested in receiving MBMS by using SC-PTM.

Mapping between the logical channels and the transport channels in uplink, in E-UTRA and/or NR will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the logical channels and the transport channels in downlink, in E-UTRA and/or NR will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

The MTCH may be mapped to a Multicast Channel (MCH) being a downlink transport channel.

The MCCH may be mapped to a Multicast Channel (MCH) being a downlink transport channel.

The SC-MTCH may be mapped to a Downlink Shared Channel (DL-SCH) being a downlink transport channel.

The SC-MTCH may be mapped to a Downlink Shared Channel (DL-SCH) being a downlink transport channel.

An example of the functions of the RLC will be described. The RLC may be referred to as an RLC sublayer.

The E-UTRA RLC may have a function of segmenting (Segmentation) and/or concatenating (Concatenation) data provided from the PDCP of an upper layer, and providing the segmented and/or concatenated data to a lower layer. The E-UTRA RLC may have a function of reassembling (reassembly) and re-ordering data provided from a lower layer, and providing the reassembled and re-ordered data to an upper layer.

The NR RLC may have a function of assigning data provided from the PDCP of an upper layer with a sequence number independent of a sequence number assigned in the PDCP. The NR RLC may have a function of segmenting (Segmentation) data provided from the PDCP, and providing the segmented data to a lower layer. The NR RLC may have a function of reassembling (reassembly) data provided from a lower layer, and providing the reassembled data to an upper layer. The RLC may have a data retransmission function and/or retransmission request function (Automatic Repeat reQuest (ARQ)).

The RLC may have a function of performing error correction using the ARQ. Control information that indicates data required to be retransmitted and that is transmitted from a receiving side to a transmitting side of the RLC in order to perform the ARQ may be referred to as a status report. A status report transmission indication transmitted from the transmitting side to the receiving side of the RLC may be referred to as a poll. The RLC may have a function of detecting data duplication. The RLC may have a function of discarding data.

The RLC may have three modes, namely a Transparent Mode (TM), an Unacknowledged Mode (UM), and an Acknowledged Mode (AM). In the TM, segmentation of data received from an upper layer may not be performed, and addition of an RLC header may not be performed. A TM RLC entity may be a uni-directional entity, and may be configured as a transmitting TM RLC entity or as a receiving TM RLC entity. In the UM, segmentation and/or concatenation of data received from an upper layer, addition of an RLC header, and the like may be performed, but retransmission control of data may not be performed. A UM RLC entity may be a uni-directional entity, or may be a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, the UM RRC entity may be configured as a UM RLC entity constituted with a transmitting side and a receiving side. In the AM, segmentation and/or concatenation of data received from an upper layer, addition of an RLC header, retransmission control of data, and the like may be performed. An AM RLC entity may be a bi-directional entity, and may be configured as an AM RLC constituted with a transmitting side and a receiving side. Note that data provided to a lower layer and/or data provided from a lower layer in the TM may be referred to as a TMD PDU. Data provided to a lower layer and/or data provided from a lower layer in the UM may be referred to as a UMD PDU. Data provided to a lower layer or data provided from a lower layer in the AM may be referred to as an AMD PDU.

An RLC PDU format used in the E-UTRA RLC and an RLC PDU format used in the NR RLC may be different from each other. The RLC PDU may include an RLC PDU for data and an RLC PDU for control. The RLC PDU for data may be referred to as an RLC DATA PDU (RLC Data PDU, RLC data PDU). The RLC PDU for control may be referred to as an RLC CONTROL PDU (RLC Control PDU, RLC control PDU).

An example of the functions of the PDCP will be described. The PDCP may be referred to as a PDCP sublayer.

The PDCP may have a function of maintenance of the sequence number. The PDCP may have a header compression and decompression function for efficiently transmitting, in wireless sections, user data such as an IP Packet and an Ethernet frame. A protocol used for header compression and decompression for an IP packet may be referred to as a Robust Header Compression (ROHC) protocol. A protocol used for header compression and decompression for an Ethernet frame may be referred to as an Ethernet (trade name) Header Compression (EHC) protocol. The PDCP may have a function of encryption and decryption of data. The PDCP may have a function of integrity protection and integrity verification of data. The PDCP may have a function of re-ordering. The PDCP may have a function of retransmitting the PDCP SDU. The PDCP may have a function of discarding data using a discard timer. The PDCP may have a Duplication function. The PDCP may have a function of discarding pieces of data received in a duplicate manner.

The PDCP entity may be a bi-directional entity, and may include a transmitting PDCP entity and a receiving PDCP entity. A PDCP PDU format used in the E-UTRA PDCP and a PDCP PDU format used in the NR PDCP may be different from each other. The PDCP PDU may include a PDCP PDU for data and a PDCP PDU for control. The PDCP PDU for data may be referred to as a PDCP DATA PDU (PDCP Data PDU, PDCP data PDU). The PDCP PDU for control may be referred to as a PDCP CONTROL PDU (PDCP Control PDU, PDCP control PDU).

An example of the functions of the SDAP will be described. The SDAP is a service data adaptation protocol layer.

The SDAP may have a function of performing association (mapping) between a downlink QoS flow transmitted from the 5GC 110 to the terminal apparatus via the base station apparatus and a data radio bearer (DRB) and/or mapping between an uplink QoS flow transmitted from the terminal apparatus to the 5GC 110 via the base station apparatus and a DRB. The SDAP may have a function of storing mapping rule information. The SDAP may have a function of performing marking of a QoS flow identifier (QoS Flow ID (QFI)). Note that the SDAP PDU may include an SDAP PDU for data and an SDAP PDU for control. The SDAP PDU for data may be referred to as an SDAP DATA PDU (SDAP Data PDU, SDAP data PDU).

The SDAP PDU for control may be referred to as an SDAP CONTROL PDU (SDAP Control PDU, SDAP control PDU). Note that, in the terminal apparatus, one SDAP entity may be present for one PDU session.

An example of the functions of the RRC will be described.

The RRC may have a broadcast function. The RRC may have a Paging function from the EPC 104 and/or the 5GC 110. The RRC may have a Paging function from the gNB 108 or the eNB 102 connected to the 5GC 100. The RRC may have an RRC connection management function. The RRC may have a radio bearer control function. The RRC may have a cell group control function. The RRC may have a mobility control function. The RRC may have a terminal apparatus measurement reporting and terminal apparatus measurement reporting control function. The RRC may have a QoS management function. The RRC may have a radio link failure detection and recovery function. With use of an RRC message, the RRC may perform broadcast, paging, RRC connection management, radio bearer control, cell group control, mobity control, terminal apparatus measurement reporting and terminal apparatus measurement reporting control, QoS management, radio link failure detection and recovery, and the like. Note that RRC messages and parameters used in the E-UTRA RRC may be different from RRC messages and parameters used in the NR RRC.

The RRC message may be transmitted using the BCCH of the logical channel, may be transmitted using the PCCH of the logical channel, may be transmitted using the CCCH of the logical channel, may be transmitted using the DCCH of the logical channel, or may be transmitted using the MCCH of the logical channel.

In the RRC message transmitted using the BCCH, for example, a Master Information Block (MIB) may be included, a System Information Block (SIB) of each type may be included, or another RRC message may be included. In the RRC message transmitted using the PCCH, for example, a paging message may be included, or another RRC message may be included.

In the RRC message transmitted in the uplink (UL) direction using the CCCH, for example, an RRC setup request message (RRC Setup Request), an RRC resume request message (RRC Resume Request), an RRC reestablishment request message (RRC Reestablishment Request), an RRC system information request message (RRC System Info Request), and the like may be included. For example, an RRC connection request message (RRC Connection Request), an RRC connection resume request message (RRC Connection Resume Request), an RRC connection reestablishment request message (RRC Connection Reestablishment Request), and the like may be included. Another RRC message may be included.

In the RRC message transmitted in the downlink (DL) direction using the CCCH, for example, an RRC connection reject message (RRC Connection Reject), an RRC connection setup message (RRC Connection Setup), an RRC connection reestablishment message (RRC Connection Reestablishment), an RRC connection reestablishment reject message (RRC Connection Reestablishment Reject), and the like may be included. For example, an RRC reject message (RRC Reject), an RRC setup message (RRC Setup), and the like may be included. Another RRC message may be included.

In the RRC message transmitted in the uplink (UL) direction using the DCCH, for example, a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), a security mode complete message (Security Mode Complete), a UE capability information message (UE Capability Information), and the like may be included. For example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resume complete message (RRC Resume Complete), a security mode complete message (Security Mode Complete), a UE capability information message (UE Capability Information), and the like may be included. Another RRC message may be included.

In the RRC message transmitted in the downlink (DL) direction using the DCCH, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like may be included. For example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), and the like may be included. Another RRC message may be included.

An example of the functions of the NAS will be described. The NAS may have an authentication function. The NAS may have a function of performing mobility management. The NAS may have a function of security control.

The functions of the PHY, the MAC, the RLC, the PDCP, the SDAP, the RRC, and the NAS described above are merely an example, and a part or all of each of the functions may not be implemented. Some or all of the functions of each layer may be included in another layer.

Note that, in upper layers (not illustrated) of the AS layer of the terminal apparatus, an IP layer, and a Transmission Control Protocol (TCP) layer and a User Datagram Protocol (UDP) layer, which are upper layers of the IP layer, and the like may be present. In the upper layers of the AS layer of the terminal apparatus, an Ethernet layer may be present. This may be referred to as a PDU layer being an upper layer of the AS layer of the terminal apparatus. The PDU layer may include the IP layer, the TCP layer, the UDP layer, the Ethernet layer, and the like. In the upper layers of the IP layer, the TCP layer, the UDP layer, the Ethernet layer, and the PDU layer, an application layer may be present. The application layer may include a Session Initiation Protocol (SIP) and a Session Description Protocol (SDP) used in an IP Multimedia Subsystem (IMS) being one of service networks standardized in the 3GPP. The application layer may include protocols, such as a Real-time Transport Protocol (RTP) used for media communication and/or Real-time Transport Control Protocol (RTCP) for media communication control, and/or a HyperText Transfer Protocol (HTTP). The application layer may include a codec for various media and the like. The RRC layer may be an upper layer of the SDAP layer.

The state and the state transition of the UE 122 in LTE and NR will now be described.

Regarding the UE 122 connected to the EPC or the 5GC, the UE 122 may be in an RRC_CONNECTED state in a case that an RRC connection has been established. The state in which the RRC connection has been established may include a state in which the UE 122 retains a part or all of UE contexts to be described below. The state in which the RRC connection has been established may include a state in which the UE 122 can transmit and/or receive unicast data. Regarding the UE 122, in a case that the RRC connection is suspended, the UE 122 may be in an RRC_INACTIVE state. The case that the UE 122 is in the RRC_INACTIVE state may be a case that the UE 122 is connected to the 5GC and the RRC connection is suspended. In a case that the UE 122 is in neither the RRC_CONNECTED state nor the RRC_INACTIVE state, the UE 122 may be in an RRC_IDLE state.

Note that, in a case that the UE 122 is connected to the EPC, suspension of the RRC connection may be started by the E-UTRAN although the UE 122 does not have the RRC_INACTIVE state. In a case that the UE 122 is connected to the EPC and the RRC connection is suspended, the UE 122 may transition to the RRC_IDLE state while retaining an AS context of the UE and an identifier (resumeIdentity) used for resumption (resume). In a case that the UE 122 retains the AS context of the UE and that the E-UTRAN permits the RRC connection to be resumed and that the UE 122 needs to transition from the RRC_IDLE state to the RRC_CONNECTED state, an upper layer (for example, the NAS layer) of the RRC layer of the UE 122 may initiate the resumption of the RRC connection suspended.

The definition of the suspension of RRC connection may vary between the UE 122 connected to the EPC 104 and the UE 122 connected to the 5GC 110. All or a part of the procedures for the UE 122 to resume from suspension of RRC connection may be different between a case that the UE 122 is connected to the EPC (is suspended in the RRC_IDLE state) and a case that the UE 122 is connected to the 5GC (is suspended in the RRC_INACTIVE state).

Note that the RRC_CONNECTED state, the RRC_INACTIVE state, and the RRC_IDLE state may be respectively referred to as an RRC connected state (RRC connected mode), an RRC inactive state (RRC inactive mode), and an RRC idle state (RRC idle mode), or, in a case that there is no risk of misunderstanding, may be simply respectively referred to as a connected state (connected mode), an inactive state (inactive mode), and an idle state (idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

The Cell Group configured for the terminal apparatus from the base station apparatus will be described. The cell group may include only one Special Cell (SpCell). The cell group may include one SpCell and one or multiple Secondary Cells (SCells). In other words, the cell group may include one SpCell, and optionally one or multiple SCells. Note that, in a case that the MAC entity is associated with a Master Cell Group (MCG), the SpCell may mean a Primary Cell (PCell). In a case that the MAC entity is associated with a Secondary Cell Group (SCG), the SpCell may mean a Primary SCG Cell (PSCell). In a case that the MAC entity is not associated with the cell group, the SpCell may mean the PCell. The PCell, the PSCell, and the SCell are each a serving cell. The SpCell may support PUCCH transmission and contention-based Random Access. The SpCell may constantly be in an activated state. The PCell may be a cell used for an RRC connection establishment procedure in a case that the terminal apparatus in the RRC idle state transitions to the RRC connected state. The PCell may be a cell used for an RRC connection reestablishment procedure in which the terminal apparatus performs reestablishment of RRC connection. The PCell may be a cell used for a random access procedure in a case of a handover. The PSCell may be a cell used for the random access procedure in a case of addition of a Secondary Node (SN) to be described below. The SpCell may be a cell used for purposes other than the purposes described above. Note that, in a case that the cell group includes the SpCell and one or more SCells, it can be said that carrier aggregation (CA) is configured for the cell group. For the terminal apparatus configured with CA, a cell that provides additional radio resources to the SpCell may mean the SCell.

A group of serving cells configured by the RRC, which is a cell group using the same timing reference cell and the same timing advance value for cells out of the group configured with the uplink may be referred to as a Timing Advance Group (TAG). The TAG including the SpCell of the MAC entity may mean a Primary Timing Advance Group (PTAG). The TAG other than the PTAG may mean a Secondary Timing Advance Group (STAG).

In a case that Dual Connectivity (DC) and Multi-Radio Dual Connectivity (MR-DC) are performed, addition of a cell group for the terminal apparatus from the base station apparatus may be performed. DC may be a technology for performing data communication by using radio resources of the cell groups configured by each of a first base station apparatus (first node) and a second base station apparatus (second node). MR-DC may be a technology included in DC. In order to perform DC, the first base station apparatus may add the second base station apparatus. The first base station apparatus may be referred to as a Master Node (MN). The cell group configured by the master node may be referred to as a Master Cell Group (MCG). The second base station apparatus may be referred to as a Secondary Node (SN). The cell group configured by the secondary node may be referred to as a Secondary Cell Group (SCG). Note that the master node and the secondary node may be configured in the same base station apparatus.

In a case that DC is not configured, the cell group configured for the terminal apparatus may be referred to as an MCG. In the case that DC is not configured, the SpCell configured for the terminal apparatus may be the PCell.

Note that MR-DC may be a technology for performing DC using E-UTRA for the MCG and NR for the SCG. MR-DC may be a technology for performing DC using NR for the MCG and E-UTRA for the SCG. MR-DC may be a technology for performing DC using NR for both of the MCG and the SCG. As an example of MR-DC using E-UTRA for the MCG and NR for the SCG, there may be E-UTRA-NR Dual Connectivity (EN-DC) using the EPC as a core network, or there may be NG-RAN E-UTRA-NR Dual Connectivity (NGEN-DC) using the 5GC as a core network. As an example of MR-DC using NR for the MCG and E-UTRA for the SCG, there may be NR-E-UTRA Dual Connectivity (NE-DC) using the 5GC as a core network. As an example of MR-DC using NR for both of the MCG and the SCG, there may be NR-NR Dual Connectivity (NR-DC) using the 5GC as a core network.

Note that, in the terminal apparatus, one MAC entity may be present for each cell group. For example, in a case that DC or MR-DC is configured for the terminal apparatus, one MAC entity may be present for the MCG, and one MAC entity may be present for the SCG. The MAC entity for the MCG in the terminal apparatus may be constantly established for the terminal apparatus in all of the states (the RRC idle state, the RRC connected state, the RRC inactive state, and the like). The MAC entity for the SCG in the terminal apparatus may be created by the terminal apparatus in a case that the SCG is configured for the terminal apparatus. Configuration of the MAC entity for each cell group of the terminal apparatus may be performed in a case that the terminal apparatus receives an RRC message from the base station apparatus. In EN-DC and NGEN-DC, the MAC entity for the MCG may be an E-UTRA MAC entity, and the MAC entity for the SCG may be an NR MAC entity. In NE-DC, the MAC entity for the MCG may be an NR MAC entity, and the MAC entity for the SCG may be an E-UTRA MAC entity. In NR-DC, the MAC entities for the MCG and the SCG may each be an NR MAC entity. Note that a case that one MAC entity is present for each cell group may be alternatively described as a case that one MAC entity is present for each SpCell. One MAC entity for each cell group may be alternatively referred to as one MAC entity for each SpCell.

The radio bearers will be described. For the SRBs of E-UTRA, SRB0 to SRB2 may be defined, or SRBs other than these may be defined. For the SRBs of NR, SRB0 to SRB3 may be defined, or SRBs other than these may be defined.

SRB0 may be an SRB for an RRC message transmitted and/or received using the CCCH of the logical channel.

SRB1 may be an SRB for an RRC message, and for a NAS message before establishment of SRB2. The RRC message transmitted and/or received using SRB1 may include a piggybacked NAS message. For all of RRC messages and NAS messages transmitted and/or received using SRB1, the DCCH of the logical channel may be used.

SRB2 may be an SRB for a NAS message, and for an RRC message including logged measurement information. For all of RRC messages and NAS messages transmitted and/or received using SRB2, the DCCH of the logical channel may be used. SRB2 may have a priority lower than that of SRB1.

SRB3 may be an SRB for transmitting and/or receiving a specific RRC message in a case that EN-DC, NGEN-DC, NR-DC, or the like is configured for the terminal apparatus. For all of RRC messages and NAS messages transmitted and/or received using SRB3, the DCCH of the logical channel may be used. Other SRBs may be provided for other purposes. The DRB may be a radio bearer for user data. For an RRC message transmitted and/or received using the DRB, the DTCH of the logical channel may be used.

The radio bearers in the terminal apparatus will be described. The radio bearers include an RLC bearer. The RLC bearer may include one or two RLC entities and a logical channel. The RLC entities in a case that the RLC bearer includes two RLC entities may be the transmitting RLC entity and the receiving RLC entity in the TM RLC entity and/or the uni-directional UM mode RLC entity.

SRB0 may include one RLC bearer. The RLC bearer of SRB0 may include the RLC entity of TM, and a logical channel. SRB0 may be constantly established in the terminal apparatus in all of the states (the RRC idle state, the RRC connected state, the RRC inactive state, and the like). In a case that the terminal apparatus transitions from the RRC idle state to the RRC connected state, one SRB1 may be established and/or configured for the terminal apparatus, using an RRC message received from the base station apparatus. SRB1 may include one PDCP entity, and one or multiple RLC bearers. The RLC bearer of SRB1 may include the RLC entity of AM, and a logical channel. One SRB2 may be established and/or configured for the terminal apparatus, using an RRC message that the terminal apparatus in the RRC connected state with activated AS security receives from the base station apparatus. SRB2 may include one PDCP entity, and one or multiple RLC bearers. The RLC bearer of SRB2 may include the RLC entity of AM, and a logical channel. Note that the PDCP of SRB1 and SRB2 on the base station apparatus side may be deployed in the master node. In a case that the secondary node in EN-DC, NGEN-DC, or NR-DC is added or in a case that the secondary node is changed, one SRB3 may be established and/or configured for the terminal apparatus, using an RRC message that the terminal apparatus in the RRC connected state with activated AS security receives from the base station apparatus. SRB3 may be a direct SRB between the terminal apparatus and the secondary node. SRB3 may include one PDCP entity, and one or multiple RLC bearers. The RLC bearer of SRB3 may include the RLC entity of AM, and a logical channel. The PDCP of the SRB3 on the base station apparatus side may be deployed in the secondary node.

One or multiple DRBs may be established and/or configured for the terminal apparatus, using an RRC message that the terminal apparatus in the RRC connected state with activated AS security receives from the base station apparatus. The DRB may include one PDCP entity, and one or multiple RLC bearers. The RLC bearer of the DRB may include the RLC entity of AM or UM, and a logical channel.

Note that, in MR-DC, the radio bearer whose PDCP is deployed in the master node may be referred to as an MN terminated bearer. In MR-DC, the radio bearer whose PDCP is deployed in the secondary node may be referred to as an SN terminated bearer. Note that, in MR-DC, the radio bearer whose RLC bearer is present only in the MCG may be referred to as an MCG bearer. In MR-DC, the radio bearer whose RLC bearer is present only in the SCG may be referred to as an SCG bearer. In DC, the radio bearer whose RLC bearer is present in both of the MCG and the SCG may be referred to as a split bearer.

In a case that MR-DC is configured for the terminal apparatus, a bearer type of SRB1 and SRB2 established/and or configured for the terminal apparatus may be an MN terminated MCG bearer and/or an MN terminated split bearer. In a case that MR-DC is configured for the terminal apparatus, a bearer type of SRB3 established/and or configured for the terminal apparatus may be an SN terminated SCG bearer. In a case that MR-DC is configured for the terminal apparatus, a bearer type of the DRB established/and or configured for the terminal apparatus may be any one of all of the bearer types.

The RLC entity established and/or configured for the RLC bearer established and/or configured for the cell group configured in E-UTRA may be the E-UTRA RLC. The RLC entity established and/or configured for the RLC bearer established and/or configured for the cell group configured in NR may be the NR RLC. In a case that EN-DC is configured for the terminal apparatus, the PDCP entity established and/or configured for the MN terminated MCG bearer may be either the E-UTRA PDCP or the NR PDCP. In a case that EN-DC is configured for the terminal apparatus, the PDCP established and/or configured for the radio bearers of other bearer types, i.e., an MN terminated split bearer, an MN terminated SCG bearer, an SN terminated MCG bearer, an SN terminated split bearer, and an SN terminated SCG bearer, may be the NR PDCP. In a case that NGEN-DC, NE-DC, or NR-DC is configured for the terminal apparatus, the PDCP entity established and/or configured for the radio bearers of all of the bearer types may be the NR PDCP.

Note that, in NR, the DRB established and/or configured for the terminal apparatus may be associated with one PDU session. One SDAP entity may be established and/or configured for one PDU session in the terminal apparatus. The SDAP entity, the PDCP entity, the RLC entity, and the logical channel established and/or configured for the terminal apparatus may be established and/or configured using an RRC message that the terminal apparatus receives from the base station apparatus.

Note that, regardless of whether or not MR-DC is configured, a network configuration in which the master node is the eNB 102 and the EPC 104 is used as a core network may be referred to as E-UTRA/EPC. A network configuration in which the master node is the eNB 102 and the 5GC 110 is used as a core network may be referred to as E-UTRA/5GC. A network configuration in which the master node is the gNB 108 and the 5GC 110 is used as a core network may be referred to as NR or NR/5GC. In a case that MR-DC is not configured, the master node described above may refer to the base station apparatus that performs communication with the terminal apparatus.

Next, the handover in LTE and NR will be described. The handover may be processing in which the UE 122 in the RRC connected state changes the serving cell. The handover may be performed in a case that the UE 122 receives an RRC message indicating handover from the eNB 102 and/or the gNB 108. The RRC message indicating handover may be a message related to reconfiguration of RRC connection including a parameter indicating handover (for example, an information element referred to as MobilityControlInfo, or an information element referred to as ReconfigurationWithSync). Note that the information element referred to as MobilityControlInfo described above may be alternatively referred to as a mobility control configuration information element, a mobility control configuration, or mobility control information. Note that the information element referred to as ReconfigurationWithSync described above may be alternatively referred to as a reconfiguration with synchronization information element, or a reconfiguration with synchronization. Alternatively, the RRC message indicating handover may be a message (for example, MobilityFromEUTRACommand, or MobilityFromNRCommand) indicating movement to a cell of another RAT. The handover may be alternatively referred to as a reconfiguration with synchronization (reconfiguration with sync). As a condition that the UE 122 can perform handover, a case that a part or all of a case that AS security is activated, a case that the SRB2 has been established, a fact that at least one DRB has been established may be included.

Note that the terminal apparatus may perform processing in which the serving cell is not changed, based on an RRC message for indicating handover. In other words, handover processing, in which the same cell as the current serving cell is a target cell, may be performed by the terminal apparatus.

Uplink Time Alignment in the MAC entity of the terminal apparatus will be described.

In the MAC entity of the terminal apparatus, the following parameter for Maintenance of uplink time alignment may be configured by the RRC.

Time alignment timer for each TAG (timeAlignmentTimner): A timer used by the MAC entity to control time in which it is considered that there is uplink time alignment between the serving cells belonging to the TAG associated with the timer (in other words, it is considered that there is uplink synchronization).

The MAC entity of the terminal apparatus performs a part or all of the following (A) to (D) for maintenance of the uplink time alignment:

(A) receive a timing advance command MAC control element, and in a case that a parameter (N_TA) indicating timing advance between the downlink and the uplink is maintained in the indicated TAG, (1) apply the timing advance command for the indicated TAG, and (2) start or restart the time alignment timer associated with the indicated TAG;

(B) in a case that the timing advance command is received on a random access response message for the serving cell belonging to a certain TAG or on an MSGB for the SpCell, a part or all of the following (B-1) to (B-3) may be performed:

(B-1) in a case that the random access preamble is not selected by the MAC entity among Contention-based random access preambles, perform processing of the following (B-1-1) to (B-1-2):

(B-1-1) apply the timing advance command for the TAG;

(B-1-2) start or restart the time alignment timer associated with the TAG;

(B-2) in a case that the condition of (B-1) is not met, and the time alignment timer associated with the TAG is not running, perform processing of the following (B-2-1) to (B-2-3):

(B-2-1) apply the timing advance command for the TAG;

(B-2-2) start the time alignment timer associated with the TAG;

(B-2-3) in a case that it is considered that Contention Resolution in the random access procedure has not succeeded, or it is considered that the contention resolution for an SI request has succeeded after transmitting HARQ feedback for the MAC PDU including a UE contention Resolution Identity MAC control element, stop the time alignment timer associated with the TAG;

(B-3) in a case that the condition of neither (B-1) nor (B-2) is met, ignore the received timing advance command;

(C) in a case that an Absolute timing advance command is received as a response for MSGA transmission including a C-RNTI MAC control element, (1) apply the timing advance command for the PTAG, and (2) start or restart the time alignment timer associated with the PTAG;

(D) in a case that the time alignment timer has expired, a part or all of the following (D-1) to (D-2) may be performed:

(D-1) in a case that the time alignment timer associated with the PTAG has expired, a part or all of the processing of the following (D-1-1) to (D-1-8) may be performed:

(D-1-1) flush all of the HARQ buffers of all of the serving cells;

(D-1-2) in a case that the PUCCH is configured for any of the serving cells, notify the RRC entity of the terminal apparatus of release of the PUCCH of all of the serving cells;

(D-1-3) in a case that the SRS is configured for any of the serving cells, notify the RRC entity of the terminal apparatus of release of the SRS of all of the serving cells;

(D-1-4) clear all of the Configured downlink assignments and the Configured uplink grants being configured;

(D-1-5) clear all of the PUSCH resources for semi-persistent CSI report;

(D-1-6) consider that all of the running time alignment timers have expired;

(D-1-7) maintain N_TA of all of the TAGs;

(D-1-8) in a case that the time alignment timer of the PTAG of the deactivated secondary cell group has expired, not perform detection and/or recovery of a beam failure in the cell of the secondary cell group;

(D-2) in a case that the condition of (D-1) is not met, and the time alignment timer associated with the STAG has expired, a part or all of the following (D-2-1) to (D-2-6) may be performed for all of the serving cells belonging to the TAG:

(D-2-1) flush all of the HARQ buffers;

(D-2-2) in a case that the PUCCH is configured, notify the RRC entity of the terminal apparatus of release thereof;

(D-2-3) in a case that the SRS is configured, notify the RRC entity of the terminal apparatus of release thereof;

(D-2-4) clear all of the Configured downlink assignments and the Configured uplink grants being configured;

(D-2-5) clear all of the PUSCH resources for semi-persistent CSI report;

(D-2-6) maintain N_TA of the TAG.

In a case that the MAC entity of the terminal apparatus stops uplink transmission in the SCell as a result of a maximum difference of the uplink timings between the TAGs of the MAC or a maximum difference of the uplink timings between the TAGs of any of the MAC entities of the terminal apparatus having exceeded an upper limit, the MAC entity may consider that the time alignment timer of the TAG associated with the SCell has expired.

In a case that the time alignment timer associated with the TAG belonging to a certain SCell is not running, the MAC entity of the terminal apparatus does not perform transmission other than transmission of the random access preamble and the MSGA in the SCell. In addition, in a case that the time alignment timer associated with the PTAG is not running, the MAC entity of the terminal apparatus does not perform all of the transmissions other than transmission of the random access preamble and the MSGA in the SpCell.

Figure 4:
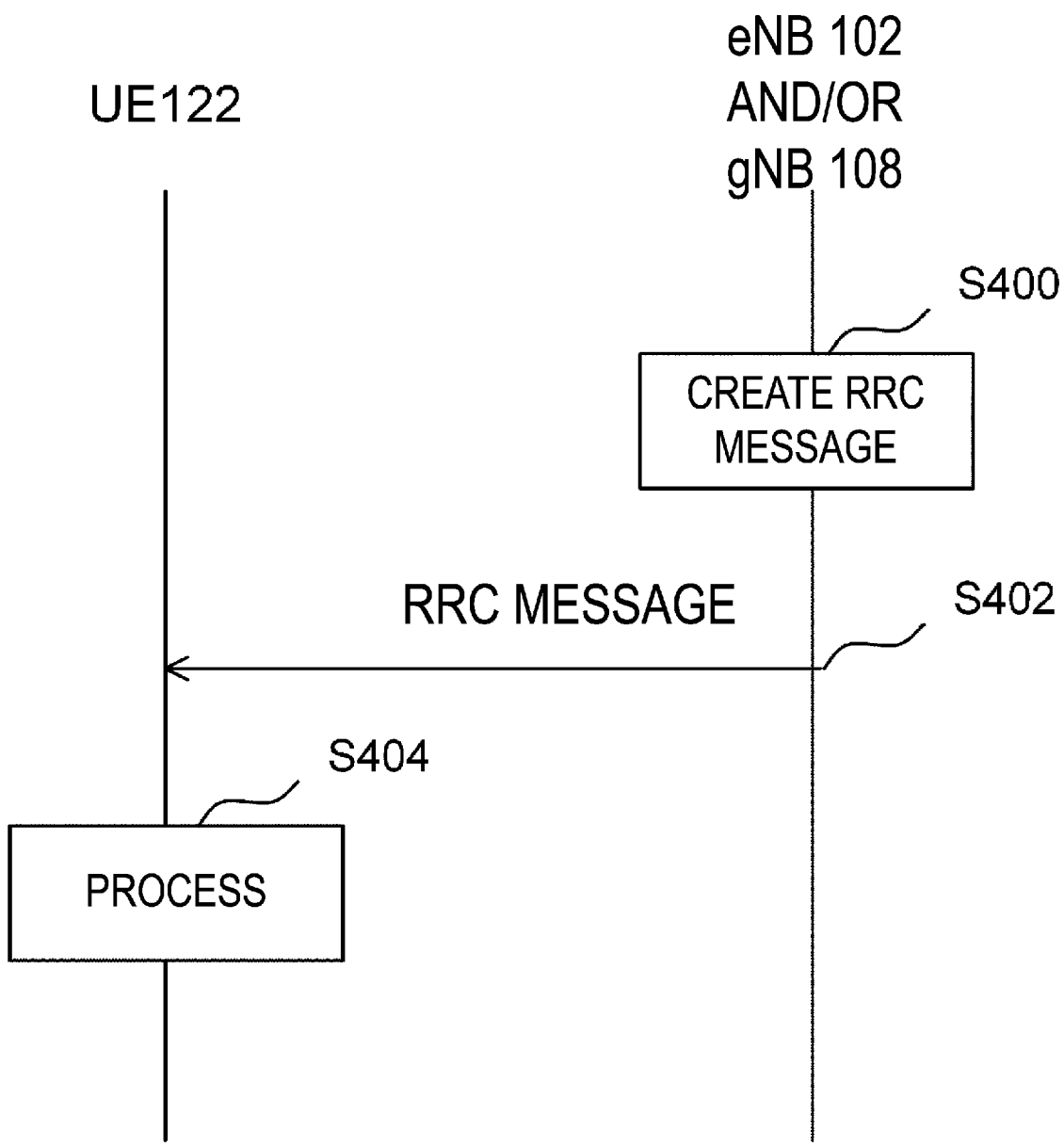
FIG. 4 is a diagram illustrating an example of a flow of a procedure for various configurations in RRC according to an embodiment of the present invention.

A flow of the RRC message transmitted and/or received between the terminal apparatus and the base station apparatus will be described. FIG. 4 is a diagram illustrating an example of a flow of a procedure for various configurations in the RRC according to an embodiment of the present invention. FIG. 4 is an example of a flow of a case in which the RRC message is transmitted from the base station apparatus (eNB 102 and/or gNB 108) to the terminal apparatus (UE 122).

In FIG. 4, the base station apparatus creates an RRC message (step S400). The creation of the RRC message in the base station apparatus may be performed so that the base station apparatus distributes broadcast information (System Information (SI)) and paging information. The creation of the RRC message in the base station apparatus may be performed so that the base station apparatus causes a specific terminal apparatus to perform processing. The processing that the specific terminal apparatus is caused to perform may include, for example, processing such as configuration related to security, reconfiguration of RRC connection, handover to a different RAT, suspension of RRC connection, and release of RRC connection. The processing of reconfiguration of RRC connection may include, for example, processing such as control (establishment, change, release, or the like) of a radio bearer, control (establishment, addition, change, release, or the like) of a cell group, measurement configuration, handover, and security key update. The creation of the RRC message in the base station apparatus may be performed for a response to an RRC message transmitted from the terminal apparatus. The response to the RRC message transmitted from the terminal apparatus may include, for example, a response to an RRC setup request, a response to an RRC reconnection request, a response to an RRC resume request, and the like. The RRC message includes information (parameters) for various information notifications and configurations. These parameters may be referred to as fields and/or information elements, and may be notated by using a notation method referred to as Abstract Syntax Notation One (ASN.1).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404). The terminal apparatus that has performed the processing may transmit an RRC message for a response to the base station apparatus (not illustrated).

In addition to the example described above, the RRC message may be used for other purposes as well.

Note that, in MR-DC, the RRC on the master node side may be used for transfer of the RRC message for the configuration (cell group configuration, radio bearer configuration, measurement configuration, and the like) on the SCG side to and from the terminal apparatus.

For example, in EN-DC or NGEN-DC, the RRC message of E-UTRA transmitted and/or received between the eNB 102 and the UE 122 may include the RRC message of NR in a form of a container. In NE-DC, the RRC message of NR transmitted and/or received between the gNB 108 and the UE 122 may include the RRC message of E-UTRA in a form of a container. The RRC message for the configuration on the SCG side may be transmitted and/or received between the master node and the secondary node.

Note that an embodiment is not limited to a case that MR-DC is used, and the RRC message for E-UTRA transmitted from the eNB 102 to the UE 122 may include the RRC message for NR, and the RRC message for NR transmitted from the gNB 108 to the UE 122 may include the RRC message for E-UTRA.

An example of the parameters included in the RRC message related to reconfiguration of RRC connection will be described. FIG. 7 is an example of an ASN.1 notation representing a field and/or an information element related to a radio bearer configuration included in a message related to reconfiguration of RRC connection in NR in FIG. 4. FIG. 8 is an example of an ASN.1 notation representing a field and/or an information element related to a radio bearer configuration included in a message related to reconfiguration of RRC connection in E-UTRA in FIG. 4. Not only in the figures of FIG. 7 and FIG. 8, in examples of the ASN.1 according to an embodiment of the present invention, <omitted> and <partly omitted> are not a part of the notation of the ASN.1 and indicate that other information is omitted at these positions. Note that there may also be omitted information elements in a part where neither <omitted> nor <partly omitted> is indicated. Note that, in an embodiment of the present invention, the examples of the ASN.1 do not correctly comply with the ASN.1 notation method. In an embodiment of the present invention, the examples of the ASN.1 are notations of examples of parameters of the RRC message according to an embodiment of the present invention, and other terms and other notations may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, fields, information elements, and the like included in the RRC message and notated in ASN.1 may be referred to as information, or may be referred to as parameters. Note that the message related to reconfiguration of RRC connection may be an RRC reconfiguration message in NR or an RRC connection reconfiguration message in E-UTRA.

Activation and deactivation of a cell will be described. In the terminal apparatus communicating in dual connectivity, the master cell group (MCG) and the secondary cell group (SCG) are configured by the message related to reconfiguration of RRC connection. Each cell group may include a special cell (SpCell) and zero or more cells (secondary cells (SCells)) other than the special cell. The SpCell of the MCG is also referred to as a PCell. The SpCell of the SCG is also referred to as a PSCell. Deactivation of a cell may not be applied to the SpCell but may be applied to the SCell.

Deactivation of a cell may not be applied to the PCell but may be applied to the PSCell. In this case, deactivation of a cell may be processing different between the SpCell and the SCell.

Activation and deactivation of a cell may be processed in the MAC entity that is present for each cell group. The SCell configured for the terminal apparatus may be activated and/or deactivated by the following (A) and/or (B):
- (A) reception of a MAC CE indicating activation/deactivation of the SCell;
- (B) an SCell deactivation timer configured for each SCell not configured with the PUCCH (the SCell is deactivated based on expiry of the timer);
- (C) an SCell state (sCellState) configured for each SCell by the RRC message (the SCell is activated based on that a field of the SCell state is included in configuration of the SCell).

Specifically, the MAC entity of the terminal apparatus may perform a part or all of each process of the following processing (AD) for each SCell configured in the cell group.

Processing AD

The following processing is performed:
- (1) In a case that an RRC parameter (SCell state) is configured to "activated" or the MAC CE for activating the SCell is received in a case that the SCell is configured, the MAC entity of the UE 122 performs processing (AD-1). Otherwise, that is, in a case that the MAC CE for deactivating the SCell is received, or the SCell deactivation timer expires in the SCell in the activated state, the MAC entity of the UE 122 performs processing (AD-2);
- (2) In a case that an uplink grant or a downlink assignment is reported on the PDCCH of the SCell in the activated state, or an uplink grant or a downlink assignment for the SCell in the activated state is reported on the PDCCH of a certain serving cell, or the MAC PDU is transmitted in a configured uplink grant, or the MAC PDU is received in a configured downlink assignment, the MAC entity of the UE 122 restarts the SCell deactivation timer associated with the SCell;
- (3) In a case that the SCell enters the deactivated state, the MAC entity of the UE 122 performs processing (AD-3).

Processing AD-1

The MAC entity of the terminal apparatus may perform a part or all of the following (1) to (3):
- (1) In NR, in a case that the SCell is in the deactivated state before the MAC CE for activating the SCell is received, or the RRC parameter (sCellState) configured for the SCell in a case of SCell configuration is configured to "activated", the MAC entity of the UE 122 performs processing (AD-1-1);
- (2) The MAC entity of the UE 122 starts the SCell deactivation timer associated with the SCell, or restarts the timer (in a case that the timer has already started);
- (3) In a case that the Active DL BWP is not a Dormant BWP and that there is a suspended type 1 configured uplink grant associated with the SCell). the MAC entity of the UE 122 (re-)initializes this in accordance with stored configuration. Then), the MAC entity of the UE 122 triggers the PHR.

Processing AD-1-1

The MAC entity of the terminal apparatus may perform a part or all of the following (1) to (3):
- (1) In a case that the BWP indicated by a first active downlink BWP identifier (firstActiveDownlinkBWP-Id) configured for the SCell using the RRC message is not configured as the Dormant BWP, the MAC entity of the UE 122 performs processing (AD-1-1-1);
- (2) In a case that the BWP indicated by the first active downlink BWP identifier (firstActiveDownlinkBWP-Id) configured for the SCell using the RRC message is configured for the Dormant BWP, and that a BWP deactivation timer (bwp-InactivityTimer) of the serving cell is running, the MAC entity of the UE 122 stops the timer;
- (3) The MAC entity of the UE 122 activates a downlink BWP indicated by the first active downlink BWP identifier (firstActiveDownlinkBWP-Id) configured for the SCell using the RRC message and an uplink BWP indicated by a first active uplink BWP identifier (firstActiveUplinkBWP-Id).

Processing AD-1-1-1

The MAC entity of the terminal apparatus may bring the SCell into the activated state at prescribed timing, and apply (perform) regular SCell Operation including a part or all of the following (A) to (E):
- (A) transmit a sounding reference signal (SRS) in the SCell;
- (B) report channel state information (CSI) for the SCell;
- (C) monitor the PDCCH in the SCell;
- (D) monitor the PDCCH for the SCell (in a case that scheduling for the SCell is performed in another serving cell);
- (E) perform PUCCH transmission in the SCell in a case that the PUCCH is configured.

Processing AD-2

The MAC entity of the terminal apparatus may perform a part or all of the following (A) to (D):
- (A) deactivate the SCell at prescribed timing;
- (B) stop the SCell deactivation timer associated with the SCell;
- (C) deactivate all of the Active BWPs associated with the SCell;
- (D) flush the HARQ buffer associated with the SCell.

Processing AD-3

The MAC entity of the terminal apparatus may perform a part or all of the following (A) to (D):
- (A) not transmit an SRS in the SCell;
- (B) not report CSI for the SCell;
- (C) not transmit the PUCCH, the UL-SCH, and/or the RACH in the SCell;
- (D) not monitor the PDCCH for the SCell and/or the PDCCH for the SCell.

As described above, activation and deactivation of the SCell is performed by the MAC entity performing the processing (AD).

In a case that the SCell is added as described above, the initial state of the SCell may be configured by the RRC message.

Here, the SCell deactivation timer will be described. A value (information related to time at which the timer is considered to have expired) of the SCell deactivation timer may be reported, by the RRC message, to the SCell not configured with the PUCCH. For example, in a case that information indicating 40 ms as the value of the SCell deactivation timer is reported by the RRC message, in the processing (AD), the timer is considered to have expired after the elapse of time (here, 40 ms) reported without stopping of the timer since the timer is started or restarted. The SCell deactivation timer may be a timer referred to as sCellDeactivationTimer.

Here, a bandwidth part (BWP) will be described.

The BWP may be a partial band or an entire band of the serving cell. The BWP may be referred to as a Carrier BWP. The terminal apparatus may be configured with one or multiple BWPs. A certain BWP may be configured by information included in broadcast information associated with a synchronization signal detected in initial cell search. A certain BWP may be a frequency bandwidth associated with a frequency for performing the initial cell search. A certain BWP may be configured by RRC signalling (for example, Dedicated RRC signalling). A downlink BWP (DL BWP) and an uplink BWP (UL BWP) may be separately configured. One or multiple uplink BWPs may be associated with one or multiple downlink BWPs. Association between the uplink BWP and the downlink BWP may be prescribed association, may be association by RRC signalling (for example, Dedicated RRC signalling), may be association by physical layer signalling (for example, downlink control information (DCI) reported on a downlink control channel, or may be a combination of those.

The BWP may include a group of continuous Physical Resource Blocks (PRBs). For the terminal apparatus in the connected state, parameters of the BWP(s) (one or multiple BWPs) of each component carrier may be configured. The parameters of the BWP of each component carrier may include a part or all of: (A) a type of a cyclic prefix; (B) a subcarrier spacing; (C) a frequency position of the BWP (for example, a start position on a low frequency side of the BWP or a center frequency position) (as the frequency position, for example, ARFCN may be used, or an offset from a specific subcarrier of the serving cell may be used. A unit of the offset may be a subcarrier unit, or may be a resource block unit. Both of the ARFCN and the offset may be configured); (D) a bandwidth of the BWP (for example, the number of PRBs); (E) resource configuration information of a control signal; and (F) center frequency position of an SS block (as the frequency position, for example, ARFCN may be used, or an offset from a specific subcarrier of the serving cell may be used. A unit of the offset may be a subcarrier unit, or may be a resource block unit. Both of the ARFCN and the offset may be configured). The resource configuration information of a control signal may be at least included in configuration of a part or all of the BWPs of the PCell and/or the PSCell.

The terminal apparatus may perform transmission and/or reception in an active BWP (Active BWP) out of the one or multiple configured BWPs. A maximum of one uplink BWP and/or a maximum of one downlink BWP may be configured to be an active BWP at certain time out of the one or multiple BWPs configured for one serving cell associated with the terminal apparatus. The activated downlink BWP is also referred to as an Acitve DL BWP. The activated uplink BWP is also referred to as an Active UL BWP.

Next, deactivation of the BWP will be described. In one serving cell, one or multiple BWPs may be configured. BWP switching in the serving cell is used to activate a deactivated BWP (also referred to as an Inactive BWP) and deactivate an activated BWP.

The BWP switching is controlled by the MAC entity itself for the PDCCH indicating a downlink assignment or an uplink grant, the BWP deactivation timer, RRC signalling, or initiation of a random access procedure. The Active BWP of the serving cell is indicated by the RRC or the PDCCH.

Next, a Dormant BWP will be described. Entering to the dormant BWP or leaving from the dormant BWP is performed through the BWP switching. This control is performed by the PDCCH for each SCell, or for each group referred to as a dormancy SCell group (Dormancy SCell Group). Configuration of the dormancy SCell group is indicated by the RRC signalling. In the current specifications, the dormant BWP is applied to only the SCell. Note that, it may be understood that the dormant BWP is not for changing a certain BWP into the dormant state but is one BWP configured for dormancy out of one or multiple BWPs configured for the UE. There may be multiple BWPs that are configured for the UE for dormancy.

A certain BWP being the dormant BWP may be indicated by no inclusion of a specific parameter in the configuration of the BWP. For example, no inclusion of a PDCCH-Config information element, being an information element for configuring parameters of the PDCCH specific to the UE included in the configuration of the downlink BWP, may indicate that the BWP is the dormant BWP. For example, no configuration (no inclusion) of a part of parameters included in the PDCCH-Config information element, being an information element for configuring parameters of the PDCCH specific to the UE included in the configuration of the downlink BWP, may indicate that the BWP is the dormant BWP. For example, no configuration (no inclusion) of a part or all of configurations related to a search space for defining where and/or how candidates for the PDCCH are searched, which are configured by the PDCCH-Config information element, as the configuration of a certain BWP may indicate that the BWP is the dormant BWP.

A certain configuration may not support configuration of the dormant BWP for a PUCCH SCell that allows transmission of the SpCell such as the PCell and the PSCell and the PUCCH.

The UE that has received in the SpCell the PDCCH indicating leaving from the dormant BWP outside a certain configured period (active time) activates the downlink BWP indicated by a first downlink BWP identifier reported by the RRC signalling in advance.

The UE that has received in the SpCell the PDCCH indicating leaving from the dormant BWP within the certain configured period (active time) activates the downlink BWP indicated by a second downlink BWP identifier reported by the RRC signalling in advance.

The UE that has received the PDCCH indicating entering to the dormant BWP activates the downlink BWP indicated by a third downlink BWP identifier (dormantDownlinkBWP-Id) reported by the RRC signalling in advance.

The entering to and the leaving from the dormant BWP are performed through the BWP switching, and in a case that a new BWP is activated, the BWP that has thus far been in the activated state is deactivated. In other words, in a case of leaving from the dormant BWP, the dormant BWP is deactivated, and in a case of entering to the dormant BWP, the dormant BWP is activated.

Here, the PDCCH indicating entering to the dormant BWP and the PDCCH indicating leaving from the dormant BWP will be described.

For example, the UE configured with discontinuous reception (DRX) in the SpCell may monitor the PDCCH in the Active BWP of the SpCell in order to detect a certain DCI format (for example, DCI format 2_6) outside the active time of DRX. A CRC of the DCI format may be scrambled with a certain RNTI (for example, a PS-RNTI). The UE configured with the dormancy SCell group determines switching of the Active DL BWP, based on bitmap information included in a payload of DCI format 2_6. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP.

In the active time of DRX, the UE need not monitor the PDCCH for the purpose of detecting DCI format 2_6.

The UE configured with discontinuous reception (DRX) in the SpCell may monitor the PDCCH in the Active BWP of the SpCell in order to detect certain DCI formats (for example, DCI formats 0_1 and 1_1) in the active time of DRX. A CRC of the DCI formats may be scrambled with a certain RNTI (for example, a C-RNTI or an MCS-C-RNTI). The UE configured with the dormancy SCell group determines switching of the Active DL BWP, based on bitmap information included in a payload of DCI format 0_1 or DCI format 1_1. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP. The "another BWP configured in advance" may be a BWP different from the "another BWP configured in advance" used in the description for DCI format 2_6.

Outside the active time of DRX, the UE need not monitor the PDCCH for the purpose of detecting DCI format 0_1 and DCI format 1_1.

To monitor the PDCCH indicating leaving from the dormant BWP may be to monitor the PDCCH for the purpose of detecting DCI format 2_6 outside the active time of DRX, and to monitor the PDCCH for the purpose of detecting DCI format 0_1 and DCI format 1_1 in the active time of DRX.

In each activated serving cell in which the BWP is configured, in a case that the BWP is activated (Active BWP), and the BWP is not the dormant BWP, the MAC entity may perform a part or all of the following (A) to (H):
(A) transmit the UL-SCH in the BWP;
(B) transmit the RACH in the BWP in a case that a PRACH occasion is configured;
(C) monitor the PDCCH in the BWP;
(D) transmit the PUCCH in the BWP in a case that the PUCCH is configured;
(E) report the CSI in the BWP;
(F) transmit the SRS in the BWP in a case that the SRS is configured;
(G) receive the DL-SCH in the BWP;
(H) initialize a configured uplink grant of grant type 1 configured and suspended in the BWP.

In each activated serving cell in which the BWP is configured, in a case that the BWP is activated (Active BWP), and the BWP is the dormant BWP, the MAC entity may perform a part or all of the following (A) to (G):
(A) stop the BWP deactivation timer of the serving cell of the BWP, in a case that the BWP deactivation timer is running;
(B) not monitor the PDCCH of the BWP;
(C) not monitor the PDCCH for the BWP;
(D) not receive the DL-SCH in the BWP;
(F) not transmit the SRS in the BWP;
(G) not transmit the UL-SCH in the BWP;
(H) not transmit the RACH in the BWP;
(I) not transmit the PUCCH in the BWP;
(J) clear each of a configured downlink assignment and a configured uplink grant of grant type 2 associated with the SCell;
(K) suspend a configured uplink grant of grant type 1 associated with the SCell;
(L) in a case that a configuration related to a beam failure is configured, detect the Beam Failure, and in a case that the beam failure is detected, perform Beam Failure Recovery.

In a case that the BWP is deactivated, the MAC entity may perform a part or all of the following (A) to (I):
(A) not transmit the UL-SCH in the BWP;
(B) not transmit the RACH in the BWP;
(C) not monitor the PDCCH in the BWP;
(D) not transmit the PUCCH in the BWP;
(E) not report the CSI in the BWP;
(F) not transmit the SRS in the BWP;
(G) not receive the DL-SCH in the BWP;
(H) clear the configured uplink grant of grant type 2 configured in the BWP;
(I) suspend the configured uplink grant of grant type 1 of the deactivated BWP (inactive BWP).

Next, the random access procedure in the UE configured with the BWP will be described.

In a case of initiating the random access procedure in a certain serving cell, in a selected carrier of the serving cell, the MAC entity may perform a part or all of the processing of the following (A) to (E):
(A) in a case that a resource (occasion) for transmitting the PRACH is not configured for the Active UL BWP, (A1) switch the Active UL BWP to the BWP indicated by an RRC parameter (initialUplinkBWP), and (A2) in a case that the serving cell is the SpCell, switch the Active UL BWP to the BWP indicated by an RRC parameter "initial downlink BWP" (initialDownlinkBWP);
(B) in a case that a resource (occasion) for transmitting the PRACH is configured for the Active UL BWP, the serving cell is the SpCell, and the Active DL BWP and the Active UL BWP do not include the same identifier (bwp-Id), switch the Active DL BWP to the BWP of an identifier the same as the identifier of the Active UL BWP;
(C) in a case that the BWP deactivation timer associated with the Active DL BWP of the serving cell is running, stop the timer;
(D) in a case that the serving cell is the SCell and the BWP deactivation timer associated with the Active DL BWP of the SpCell is running, stop the timer;
(E) perform the random access procedure in the Active DL BWP of the SpCell and the Active UL BWP of the serving cell.

Next, the BWP deactivation timer will be described. For each activated serving cell (Activated Serving Cell) configured with the BWP deactivation timer, the MAC entity performs the processing of the following (A). The BWP deactivation timer may be a timer referred to as bwp-InactivityTimer. (A) is as follows:
- (A) in a case that an identifier (defaultDownlinkBWP-Id) of a default downlink BWP is configured, and the Active DL BWP is not the BWP indicated by an identifier (dormantDownlinkBWP-Id), or in a case that the identifier (defaultDownlinkBWP-Id) of the default downlink BWP is not configured, the Active DL BWP is not initialDownlinkBWP, and the Active DL BWP is not the BWP indicated by the identifier (dormantDownlinkBWP-Id), the MAC entity performs the processing of the following (A-1) and (A-2):
  - (A-1) in a case that the PDCCH addressed to a C-RNTI or a CS-RNTI indicating a downlink assignment or an uplink grant is received in the Active DL BWP, the PDCCH addressed to a C-RNTI or a CS-RNTI indicating a downlink assignment or an uplink grant for the Active DL BWP is received, the MAC PDU is transmitted in a configured uplink grant, or the MAC PDU is received in a configured downlink assignment, the MAC entity performs the processing of the following (A-1-1):
    - (A-1-1) in a case that the random access procedure associated with the serving cell is not being performed, or the random access procedure being performed associated with the serving cell successfully completed in response to reception of the PDCCH addressed to the C-RNTI, start or restart the BWP deactivation timer associated with the Active DL BWP;
  - (A-2) in a case that the BWP deactivation timer associated with the Active DL BWP expires, the MAC entity performs the processing of the following (A-2-1):
    - (A-2-1) in a case that defaultDownlinkBWP-Id is configured, perform BWP switching for the BWP indicated by defaultDownlinkBWP-Id, otherwise, perform BWP switching for initialDownlinkBWP.

In a case that the MAC entity receives the PDCCH for BWP switching and finishes switching the Active DL BWP, the MAC entity may perform the processing of the following (A):
- (A) in a case that the identifier (defaultDownlinkBWP-Id) of the default downlink BWP is configured, the switched Active DL BWP is not the BWP indicated by the identifier (dormantDownlinkBWP-Id), and the switched Active DL BWP is not the BWP indicated by dormantDownlinkBWP-Id, start or restart the BWP deactivation timer associated with the Active DL BWP.

Next, a procedure for detection and recovery of a beam failure will be described.

In the MAC entity, a beam failure recovery procedure may be configured for each serving cell by the RRC. The beam failure is detected by counting a beam failure instance report reported from a lower layer (PHY layer) to the MAC entity. The MAC entity may perform a part or all of the processing of the following (A), (B), and (C) in each serving cell for beam failure detection:
- (A) in a case that the beam failure instance report is received from a lower layer, start or restart the timer (beamFailureDetectionTimer) and increment a counter (BFI-COUNTER) by 1. In a case that a value of BFI_COUNTER is equal to or larger than a configured threshold (beamFailureInstanceMaxCount), perform the processing of the following (A-1):
  - (A-1) in a case that the serving cell is the SCell, trigger a beam failure recovery (BFR) for the serving cell, otherwise, initiate the random access procedure in the SpCell.
- (B) in a case that beamFailureDetectionTimer for the serving cell expires, or a configuration of beamFailureDetectionTimer, beamFailureInstanceMaxCount, and/or a reference signal for beam failure detection is changed by an upper layer, configure BFI_COUNTER to 0;
- (C) in a case that the serving cell is the SpCell, and the random access procedure successfully completed, configure BFI_COUNTER to 0, stop the timer (beamFailureRecoveryTimer), and consider that the beam failure recovery procedure successfully completed. Otherwise, that is, in a case that the serving cell is the SCell, the PDCCH addressed to the C-RNTI indicating a new uplink grant for transmitting information for the beam failure recovery of the SCell (for example, information included in an SCell BFR MAC CE) is received, or the SCell is in the deactivated state, configure BFI_COUNTER to 0, consider that the beam failure recovery procedure successfully completed, and cancel all of the beam failure recoveries (BFRs) triggered for the serving cell.

In a case that at least one beam failure recovery (BFR) is triggered by the beam failure recovery procedure, and it is not cancelled, the MAC entity performs the processing of the following (A):
- (A) in a case that the UL-SCH resource can include a BFR MAC CE of the SCell and its subheader with priority of logical channels being taken into consideration, include the BFR MAC CE of the SCell and its subheader. Otherwise, that is, in a case that the UL-SCH resource can include a truncated BFR MAC CE of the SCell and its subheader with priority of logical channels being taken into consideration, include the truncated BFR MAC CE of the SCell and its subheader. Otherwise, trigger a scheduling request for an SCell beam failure recovery.

Dormancy of the SCell is performed by activating the dormant BWP in the SCell. Even in a case that the SCell is in the dormant state, measurement of the CSI in the SCell, Automatic Gain Control (AGC), and beam control (beam management) including the beam failure recovery may be performed.

Next, a method of adding the PSCell and zero or more SCells of the SCG to the terminal apparatus will be described.

The addition of the PSCell and zero or more SCells of the SCG may be performed with an RRC message related to reconfiguration of RRC connection. FIG. 9 to FIG. 13 are examples of an ASN.1 notation representing fields and/or information elements related to addition of the PSCell and zero or more SCells of the SCG included in the message related to reconfiguration of RRC connection in NR.

Note that, in order to avoid complexity of description, the messages and/or the information elements in each figure may be different from actual message structures and/or information element structures and a part of structured fields and information elements may be developed, and/or fields and information elements not directly related to description may be omitted.

As illustrated in FIG. 9, in order to add the PSCell and zero or more SCells of the SCG, an RRC reconfiguration message (RRCReconfiguration message) may be used. The RRC reconfiguration message may include a part or all of pieces of information of the following (A) to (E). The RRC reconfiguration message may include other information. (A) to (E) are as follows:
- (A) an identifier of an RRC transaction (rrc-Transaction-Identifier);
- (B) a configuration for adding, modifying, and releasing the radio bearer (radioBearerConfig);
- (C) a configuration of the secondary cell group (secondaryCellGroup);
- (D) a configuration of the master cell group (masterCellGroup);
- (E) RRC configuration of the secondary cell group in MR-DC (mrdc-SecondaryCellGroupConfig).

In a case that the RRC reconfiguration message is notified to the terminal apparatus on SRB3, the configuration of the SCG may be notified by the configuration of above (C) of the RRCReconfiguration message. In a case that the RRC reconfiguration message is notified to the terminal apparatus on SRB1, the configuration of the SCG may be notified using the RRC reconfiguration message generated by the secondary node, which is included in above (E) of the RRCReconfiguration message generated by the master node. In this case, the configuration of the SCG may be notified using the configuration of above (C) included in the RRC reconfiguration message generated by the secondary node. Another message may be used for the configuration of the SCG.

The configuration of the secondary cell group may be given by a cell group configuration information element (CellGroupConfigIE). As illustrated in FIG. 10, the cell group configuration information element may include a part or all of pieces of information of the following (A) to (H). The cell group configuration information element may include other information. (A) to (H) are as follows:
- (A) an identifier of the cell group (cellGroupId);
- (B) a configuration for adding and/or modifying the RLC bearer (rlc-BearerToAddModList);
- (C) a configuration for releasing the RLC bearer (rlc-BearerToReleaseList);
- (D) a configuration of the MAC of the cell group (mac-CellGroupConfig);
- (E) a configuration of the PHY of the cell group (physicalCellGroupConfig);
- (F) a configuration of the SpCell (spCellConfig);
- (G) a configuration for adding and modifying the SCell (sCellToAddModList);
- (H) a configuration for releasing the SCell (sCellToReleaseList).

The SpCell may be added and/or configured by the configuration of the SpCell of above (F), and the SCell may be added, modified, and/or released by the configurations of above (G) and (H). Those may be performed by other messages.

As illustrated in FIG. 11, the configuration of the SpCell may include a part or all of pieces of information of the following (A) to (D). The configuration of the SpCell may include other information. (A) to (D) are as follows:
- (A) an index for identifying the serving cells (servCellIndex);
- (B) reconfiguration with synchronization (reconfigurationWithSync);
- (C) a value of a timer and information of a constant used for determination of a radio link failure (rlf-TimersAndConstants) or the like;
- (D) a configuration of a parameter specific to the terminal apparatus of the SpCell (spCellConfigDedicated).

As illustrated in FIG. 12, the information element of the reconfiguration with synchronization may include a part or all of pieces of information of the following (A) to (D). The information of reconfiguration with synchronization may include other information. (A) to (D) are as follows:
- (A) a configuration of a parameter specific to a cell of the SpCell (spCellConfigCommon);
- (B) a new terminal identifier (UE-Identity) value (newUE-Identity);
- (C) a value of a timer T304 (t304);
- (D) a configuration of a parameter specific to the terminal apparatus of the RACH (rach-ConfigDedicated).

The configuration of the parameter specific to the terminal apparatus of the RACH may include a parameter (CFRA) used for contention free (Contintion free) random access. Note that, in a case that the CFRA is not included in the configuration, the terminal apparatus may perform contention based (Contition based random access in the random access procedure. The CFRA may include information of an RA Occasion used in contention free random access.

The configuration of the parameter specific to the cell of the SpCell may be given by an information element (ServingCellConfigCommon IE) used for configuring the parameter specific to a cell of the serving cell. As illustrated in FIG. 13, the information element used for configuring the parameter specific to the cell of the serving cell may include a part or all of pieces of information of the following (A) to (D). The information element used for configuring the parameter specific to the cell of the serving cell may include other information. (A) to (D) are as follows:
- (A) a physical cell identifier (physCellId);
- (B) a downlink common parameter in the cell (downlinkConfigCommon),
- (C) an uplink common parameter in the cell (uplinkConfigCommon);
- (D) a configuration of a parameter specific to the terminal apparatus of the SCell (partially including a cell-specific parameter) (sCellConfigDedicated);
- (E) SSB subcarrier spacing information (ssbSubcarrierSpacing).

The downlink common parameter in the cell may include downlink frequency information (frequencyInfoDL) and/or initial downlink BWP information (initialDownlinkBWP). The downlink frequency information may include information of a frequency of the SSB used in the serving cell.

The configuration for adding and modifying the SCell may be given by one or more SCell configuration information elements (SCellConfigIE). As illustrated in FIG. 14, the SCell configuration information element(s) may include a part or all of pieces of information of the following (A) to (D). The SCell configuration information elements may include other information. (A) to (D) are as follows:
- (A) an identifier for identifying the SCell (sCellIndex);
- (B) a configuration of a parameter specific to a cell of the SCell (sCellConfigCommon);
- (C) a configuration of a parameter specific to the terminal apparatus of the SCell (partially including a cell-specific parameter) (sCellConfigDedicated);
- (D) information for indicating activation and deactivation of the SCell (sCellState-r16).

As an example, a procedure of adding the PSCell and zero or more SCells of the SCG using the above RRC messages and information elements will be described. Note that the RRC messages and the information elements used in description are merely an example, and terms and structures in a case that the procedure is performed are not limited to these.

The RRC entity of the terminal apparatus that has received the RRCReconfiguration message may perform a part or all of the following (A) to (F). The terminal apparatus that has received the RRCReconfiguration message may perform other processing. (A) to (F) are as follows:
  (A) in a case that masterCellGroup is included in RRCReconfiguration, perform processing (BD-1) for the master cell group, based on masterCellGroup;
  (B) in a case that secondaryCellGroup is included in RRCReconfiguration, perform processing (BD-1) for the secondary cell group, based on secondaryCellGroup;
  (C) in a case that radioBearerConfig is included in RRCReconfiguration, configure the radio bearer, based on radioBearerConfig;
  (D) set contents to be included in the RRC reconfiguration complete message;
  (E) in a case that reconfigurationWithSync is included in the configuration (spCellConfig) of the SpCell of the configuration of the secondary cell group received, initiate the random access procedure in the SpCell;
  (F) in a case that reconfigurationWithSync is included in the configuration (spCellConfig) of the SpCell of the MCG or the SCG, and the random access procedure successfully completes in the cell group of NR, stop the timer T304 of the cell group.

Processing BD-1

The RRC entity of the terminal apparatus may perform a part or all of the following (A) to (G):
  (A) in a case that CellGroupConfig includes spCellConfig including reconfigurationWithSync, the RRC entity of the terminal apparatus performs a part or all of the following (1) to (3):
    (1) perform processing (BD-2);
    (2) resume all of the suspended radio bearers;
    (3) in a case that transmission of the SCG to all of the radio bearers is suspended, resume the transmission;
  (B) in a case that rlc-BearerToReleaseList is included in CellGroupConfig, release the RLC bearer, based on rlc-BearerToReleaseList;
  (C) in a case that rlc-BearerToAddModList is included in CellGroupConfig, add and/or modify the RLC bearer, based on rlc-BearerToAddModList;
  (D) in a case that mac-CellGroupConfig is included in CellGroupConfig, configure the MAC entity of the cell group, based on mac-CellGroupConfig;
  (E) in a case that sCellToReleaseList is included in CellGroupConfig, release the SCell, based on sCellToReleaseList;
  (F) in a case that spCellConfig is included in CellGroupConfig, configure the SpCell, based on spCellConfig;
  (G) in a case that sCellToAddModList is included in CellGroupConfig, add and/or modify the SCell, based on sCellToAddModList.

Processing BD-2

The RRC entity of the terminal apparatus may perform a part or all of the following (A) to ( ):
  (A) in a case that AS security is not activated, perform processing for transitioning to RRC_IDLE and end the procedure;
  (B) start the timer T304 for the SpCell (as a target of configuration), using a value of t304 included in reconfigurationWithSync;
  (C) in a case that downlink frequency information (frequencyInfoDL) is included in reconfigurationWithSync, determine that a cell indicated by the physical cell identifier (physCellId) included in reconfigurationWithSync in an SSB frequency indicated by frequencyInfoDL is a target SpCell;
  (D) in a case that downlink frequency information (frequencyInfoDL) is not included in reconfigurationWithSync, determine that a cell indicated by the physical cell identifier (physCellId) included in reconfigurationWithSync in an SSB frequency of a Source SpCell is a target SpCell;
  (E) start downlink synchronization of the target SpCell;
  (F) acquire the MIB of the target SpCell;
  (G) in a case that a specific bearer (DAPS bearer) is not configured, perform a part or all of the following (1) to (4):
    (1) reset the MAC entity of the cell group;
    (2) in a case that the SCell not included in SCellToAddModList is configured for the cell group, bring the SCell into the deactivated state;
    (3) apply the value of newUE-Identity as the C-RNTI of the cell group;
    (4) configure a lower layer, based on received spCellConfigCommon.

Next, the timer T304 will be described. The timer T304 may be present for each cell group. A value (information of time at which the timer expires) of a certain timer (here, the timer T304) may be notified using the RRC message. For example, in a case that information indicating 1000 ms is notified as the value of the timer using the RRC message, it may be considered that the timer expires after the elapse of time (in the present example, 1000 ms) notified without stopping of the timer since the timer is started or restarted.

The terminal apparatus may start the timer T304 of the cell group to which the configuration of reconfigurationWithSync is applied, based on reception of the RRC reconfiguration message including reconfigurationWithSync.

The terminal apparatus may stop the timer T304 of the cell group to which the configuration of reconfigurationWithSync is applied, based on successful completion of random access to the target SpCell indicated by reconfigurationWithSync.

The terminal apparatus may stop the timer T304 of the SCG, based on release of the SCG.

In a case that the timer T304 of the MCG expires and a specific bearer (DAPS bearer) is not configured, the terminal apparatus may perform the RRC connection reestablishment procedure.

In a case that the timer T304 of the SCG expires, the terminal apparatus may initiate an SCG failure information procedure and thereby notify the network of the failure of reconfiguration with synchronization.

Operation of the terminal apparatus in a case that the timer T304 of the SCG expires will be further described.

In a case that the timer T304 of the secondary cell group expires, the RRC entity of the terminal apparatus performs the following processing (A) in a case that MCG transmission is not suspended, and performs the following processing (B) in a case that MCG transmission is suspended:
  (A) in a case that a preamble specific to the terminal apparatus provided by rach-ConfigDedicated is configured, release the preamble, and in order to report the failure of SCG reconfiguration with synchronization, initiate a procedure for SCG failure information;
  (B) initiate the RRC connection reestablishment procedure.

Next, the procedure for the SCG failure information will be described. The procedure may be referred to as an SCG failure information procedure.

The procedure may be used to notify the master node of E-UTRAN or NR of the SCG failure that the terminal apparatus has experienced.

The RRC entity of the terminal apparatus may initiate the procedure in order to report the SCG failure in a case that transmission of the MCG or the SCG is not suspended, and one of the conditions of the following (A) to (D) is met:
  (A) a radio link failure of the SCG has been detected;
  (B) a failure of configuration with synchronization of the SCG has been detected;
  (C) a failure of the configuration of the SCG has been detected;
  (D) a failure of Integrity check related to SRB3 has been notified from a lower layer of the SCG.

The RRC entity of the terminal apparatus that initiates the procedure performs a part or all of the following (A) to (E):
  (A) suspend SCG transmission for all of the SRBs and the DRBs;
  (B) reset the SCG MAC;
  (C) in a case that the timer T304 in the SCG is running, stop the timer T304;
  (D) in a case that a conditional reconfiguration for PSCell change is configured, stop the evaluation;
  (E) configure contents to be included in an SCG failure information (SCGFailureInformation) message, and submit the message to the lower layer for transmission.

The lower layer of the RRC of the terminal apparatus may transmit the SCG failure information (SCGFailureInformation) message to the base station apparatus.

Next, Activation and Deactivation of the SCG will be described.

In LTE and/or NR, a state (SCG deactivated state) in which the SCG is deactivated may be included as a part of the RRC_CONNECTED state.

In LTE and/or NR, the state (SCG deactivated state) in which the SCG is deactivated may be a state in which the terminal apparatus performs a part or all of the following (A) to (J) in the SpCell (PSCell) of the SCG and/or all of the cells of the SCG:
  (A) not transmit the SRS in the cell;
  (B) not report CSI for the cell;
  (C) not transmit the PUCCH, the UL-SCH, and/or the RACH in the cell;
  (D) not monitor the PDCCH of the cell and/or the PDCCH for the cell;
  (E) not monitor the PDCCH of the cell and/or the PDCCH for the cell addressed to the C-RNTI, the MCS-C-RNTI, and/or the CS-RNTI indicating an uplink grant for UL-SCH transmission in the cell;
  (F) not perform Automatic Gain Control (AGC) in the cell;
  (G) not perform beam control (beam management) including beam failure recovery in the cell;
  (H) not perform Radio Link Monitoring (RLM) in the cell;
  (I) change the BWP configured to be the dormant BWP to the activated BWP (Active BWP) in the cell;
  (J) not monitor the C-RNTI on the PDCCH in the activated dormant BWP of the cell.

To enter the SCG deactivated state may be referred to as entering the deactivated SCG. The SCG deactivated state may be a state in which the Active BWP of all of the cells of the SCG is the dormant BWP. The SCG deactivated state may be a state in which the SCG to be described later transitions from the activated state (SCG activated state) in a case that entering the deactivated SCG is indicated from the RRC entity.

In LTE and/or NR, a state (SCG activated state) in which the SCG is activated may be included as a part of the RRC_CONNECTED state.

In LTE and/or NR, the state (SCG activated state) in which the SCG is activated may be a state in which the terminal apparatus performs a part or all of the following (A) to (J) in the SpCell (PSCell) of the SCG and/or any one of the cells of the SCG:
  (A) transmit the SRS in the cell;
  (B) report CSI for the cell;
  (C) transmit the PUCCH, the UL-SCH, and/or the RACH in the cell;
  (D) monitor the PDCCH of the cell and/or the PDCCH for the cell;
  (E) monitor the PDCCH of the cell and/or the PDCCH for the cell addressed to the C-RNTI, the MCS-C-RNTI, and/or the CS-RNTI indicating an uplink grant for UL-SCH transmission in the cell;
  (F) perform Automatic Gain Control (AGC) in the cell;
  (G) perform beam control (beam management) including beam failure recovery in the cell;
  (H) perform Radio Link Monitoring (RLM) in the cell;
  (I) not change the BWP configured to be the dormant BWP to the activated BWP (Active BWP) in the cell;
  (J) monitor the C-RNTI on the PDCCH in the activated BWP of the cell.

To enter the SCG activated state may be referred to as entering the activated SCG. The SCG activated state may be a state in which the Active BWP of the SpCell and/or one or more SCells of the SCG are not the dormant BWP. The SCG deactivated state may be a state in which the SCG transitions from the deactivated state (SCG deactivated state) in a case that leaving the deactivated SCG is indicated from the RRC entity.

In LTE and/or NR, the terminal apparatus may transition the SCG to the deactivated state (in other words, may deactivate the SCG), based on reception of a part or all of the following (A) to (B). Note that the messages and the control elements in the following (A) to (B) may be reported from a cell group other than the SCG to the terminal apparatus. Each piece of information may be notified to the terminal apparatus on an RRC message, a MAC control element, or a physical control channel. (A) to (B) are as follows:
  (A) information for indicating deactivation of the SCG;
  (B) information for indicating deactivation of the SpCell.

The terminal apparatus may transition the SCG from the activated state to the deactivated state, based on a timer related to deactivation of the SCG. The terminal apparatus may transition the SCG from the activated state to the deactivated state, based on a timer related to deactivation of the PSCell.

In a case that the terminal apparatus initiates the random access procedure due to a scheduling request (i.e., initiated by the MAC entity itself), the terminal apparatus may transition the SCG from the deactivated state to the activated state. The MAC entity of the terminal apparatus may acquire, from the RRC entity of the terminal apparatus, an indication for activating the SCG, an indication of resumption from the deactivated SCG, an indication of resumption from the dormant state of the SpCell, and/or other information.

In LTE and/or NR, the terminal apparatus may transition the SCG from the deactivated state to the activated state (in other words, may activate the SCG), based on reception of a part or all of the following (A) to (D). Note that the messages and the control elements in the following (A) to (D) may be reported from a cell group other than the SCG to the terminal apparatus. Each piece of information may be notified to the terminal apparatus on an RRC message, a MAC control element, or a physical control channel. (A) to (D) are as follows:

(A) information for indicating activation of the SCG;
(B) information for indicating resumption (Resume) from the deactivated state of the SCG;
(C) information for indicating activation of the SpCell;
(D) information for indicating resumption from the deactivated state of the SpCell.

The terminal apparatus may transition the SCG from the deactivated state to the activated state, based on a timer related to deactivation of the SCG. The terminal apparatus may transition the SCG from the deactivated state to the activated state, based on a timer related to deactivation of the PSCell.

In a case that the terminal apparatus initiates the random access procedure due to a scheduling request triggered for transmitting the MAC PDU including the MAC SDU, the terminal apparatus may transition the SCG from the deactivated state to the activated state. In a case that the terminal apparatus initiates the random access procedure, the terminal apparatus may transition the SCG from the deactivated state to the activated state.

In a case that the terminal apparatus initiates the random access procedure due to a scheduling request (i.e., initiated by the MAC entity itself), the terminal apparatus may transition the SCG from the deactivated state to the activated state. The MAC entity of the terminal apparatus may acquire, from the RRC entity of the terminal apparatus, an indication for activating the SCG, an indication of resumption from the deactivated SCG, an indication of resumption from the dormant state of the SpCell, and/or other information.

The deactivation of the SCG may be referred to as entering to a Dormant SCG. The deactivation of the SCG may be activation of the dormant BWP of the SpCell of the cell group. The deactivation of the SCG may be referred to as dormancy (Dormant) of the SCG or suspension of the SCG (SCG suspension).

In a case that the SCG is in the deactivated state, all of uplink transmissions may be stopped in the SCG. In this case, information related to the SCG may be transmitted in another cell group (for example, the MCG. Alternatively, the information related to the SCG may be transmitted in the SCG (activated SCG) that has left the deactivated state.

The random access procedure in the SpCell (PSCell) may be initiated in the deactivated SCG by the trigger of the scheduling request for transmitting the MAC PDU including the MAC CE from the MAC entity, or by the MAC entity directly. In this case, the MAC PDU may not include the MAC SDU.

Meanwhile, the random access procedure in the SpCell (PSCell) may be initiated in the deactivated SCG by the trigger of the scheduling request for transmitting the MAC PDU including data (MAC SDU) from an upper layer, such as user data and an RRC message.

The resumption from the deactivated state of the SCG (activation of the SCG) may be referred to as leaving from the dormant SCG. The resumption from the deactivated state of the SCG may be performing BWP switching from the dormant BWP to another BWP (not the dormant BWP) in the SpCell of the cell group.

The resumption from the deactivated state of the SCG may be referred to as activation of the SCG (SCG Activation).

The terminal apparatus that performs the deactivation of the SCG may perform a part or all of the processing of the following (A) to (F) in the SCG:

(A) cause all of the SCells to be in the deactivated state;
(B) consider that all of the SCell deactivation timers associated with the SCells in the activated state have expired;
(C) consider that all of the SCell deactivation timers associated with the SCells in the dormant state have expired;
(D) not start or restart any of the SCell deactivation timers associated with the SCells;
(E) ignore the MAC CE for activating the SCells. For example, perform processing (AD-1) in a case that the MAC CE for activating the SCells is received and the deactivation of the SCG is not indicated (or the SCG is not in the deactivated state) in the processing (AD);
(F) perform the processing (AD-2). For example, perform the processing (AD-2) in a case that the deactivation of the SCG is indicated (or the SCG has entered the deactivated state) in the processing (AD).

The terminal apparatus that performs the resumption from the deactivated state of the SCG may perform a part or all of the processing of the following (A) to (D) in the SCG:

(A) perform processing (AD-1) to cause all of the SCells to be in the activated state;
(B) cause all of the SCells to remain in the deactivated state. Note that, because it is not the deactivated state, for example, in a case that the MAC CE for activating the SCells is received in the processing (AD), the deactivation of the SCG is not indicated (or the SCG is not in the deactivated state), and thus processing (AD-1) may be performed;
(C) in a case that the resumption from the deactivated state of the SCG is performed based on an RRC message and the RRC message includes a parameter related to random access to a part or all of the SCells, initiate the random access procedure in target SCell(s) based on the reported parameter.
(D) in a case that the resumption from the deactivated state of the SCG is performed based on an RRC message, and information for indicating the state of the SCell is included in the RRC message, determine whether to cause the state of the each SCell to be in the activated state or in the deactivated state, based on the information.

Based on the description in the above, various embodiments of the present invention will be described. Note that the processing described above may be applied to corresponding processing not described in the following description.

Figure 5:
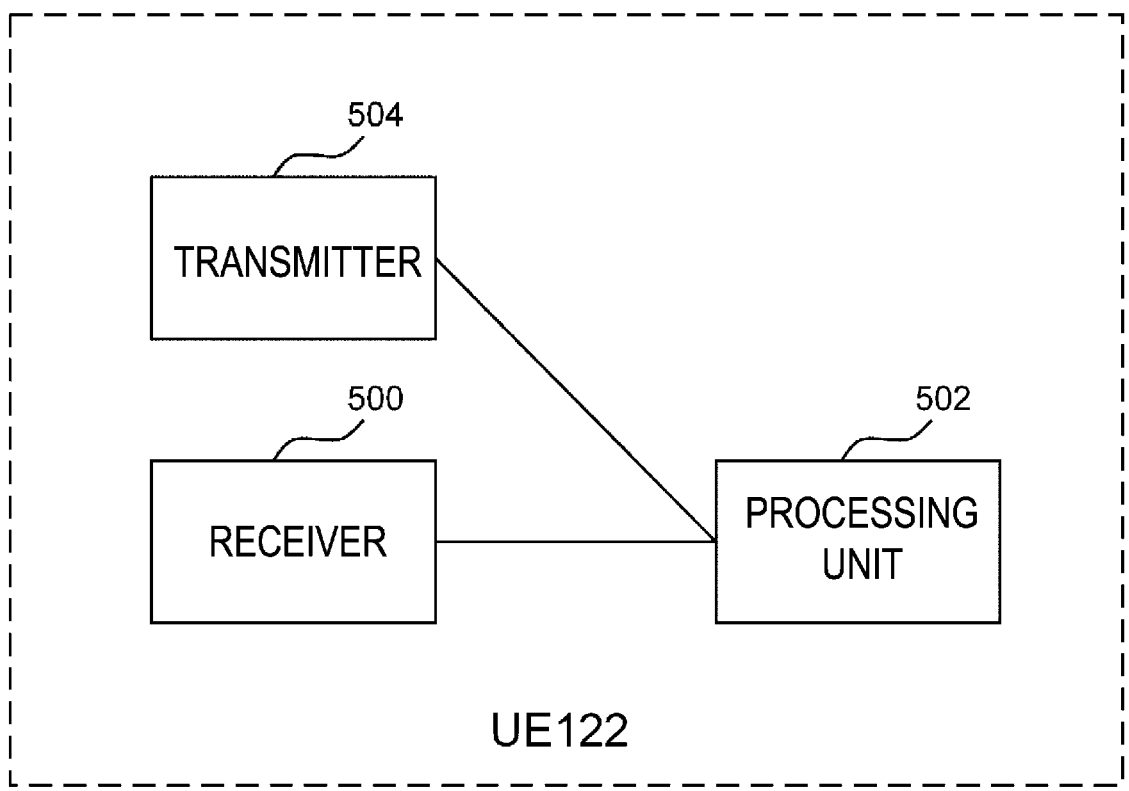
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to an aspect of the present invention in order to avoid complexity of description.

The UE 122 illustrated in FIG. 5 includes a receiver 500 that receives an RRC message and the like from the base station apparatus, a processing unit 502 that performs processing in accordance with parameters included in a received message, and a transmitter 504 that transmits an RRC message and the like to the base station apparatus. The base station apparatus may be the eNB 102, or may be the gNB 108. The processing unit 502 may include a part or all of functions of various layers (for example, the physical layer, the MAC layer, the RLC layer, the PDCP layer, the SDAP layer, the RRC layer, and the NAS layer). In other words, the processing unit 502 may include a part or all of a physical layer processing unit, a MAC layer processing unit, an RLC layer processing unit, a PDCP layer processing unit, an SDAP processing unit, an RRC layer processing unit, and a NAS layer processing unit.

Figure 6:
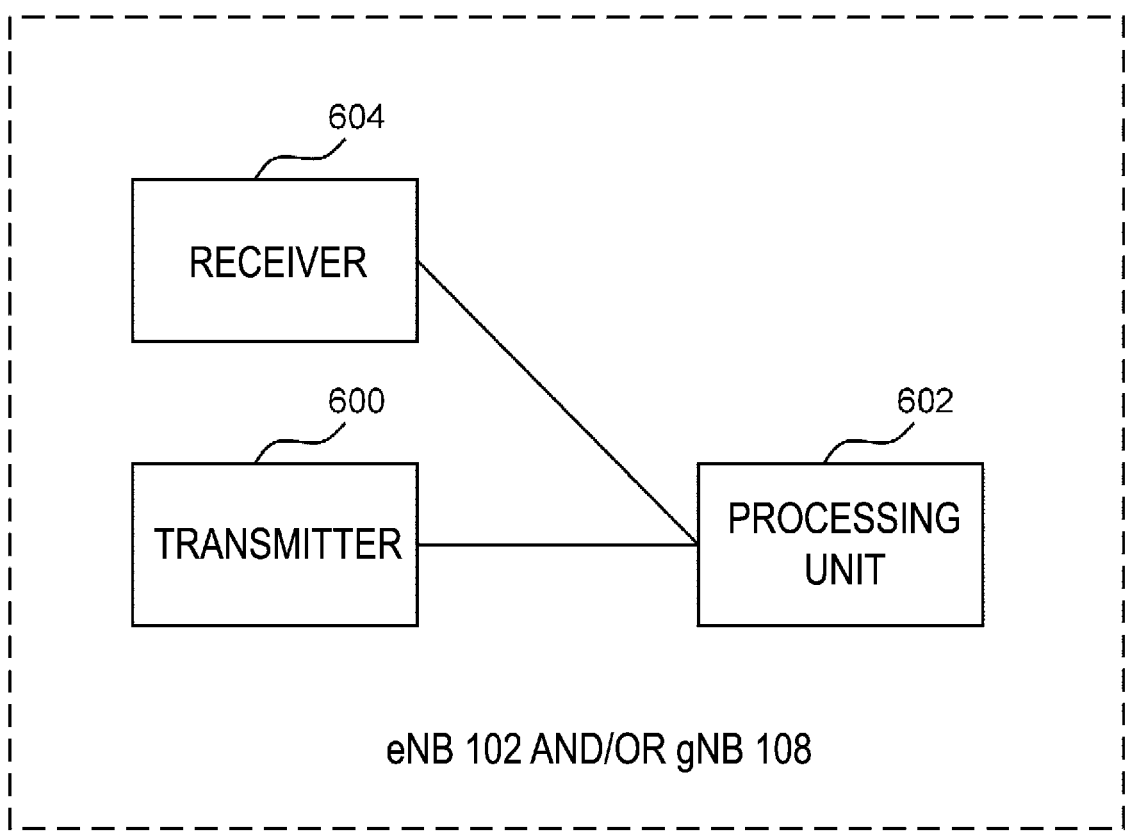
FIG. 6 is a block diagram illustrating a configuration of a base station apparatus according to an embodiment of the present invention.

FIG. 6 is a block diagram illustrating a configuration of the base station apparatus according to an embodiment of the present invention. Note that FIG. 6 illustrates only the main components closely related to an aspect of the present invention in order to avoid complexity of description. The base station apparatus may be the eNB 102, or may be the gNB 108.

The base station apparatus illustrated in FIG. 6 includes a transmitter 600 that transmits an RRC message and the like to the UE 122, a processing unit 602 that creates an RRC message including parameters and transmits the RRC message to the UE 122 to thereby cause the processing unit 502 of the UE 122 to perform processing, and a receiver 604 that receives an RRC message and the like from the UE 122. The processing unit 602 may include a part or all of functions of various layers (for example, the physical layer, the MAC layer, the RLC layer, the PDCP layer, the SDAP layer, the RRC layer, and the NAS layer). In other words, the processing unit 602 may include a part or all of a physical layer processing unit, a MAC layer processing unit, an RLC layer processing unit, a PDCP layer processing unit, an SDAP processing unit, an RRC layer processing unit, and a NAS layer processing unit.

Various examples of processing of the terminal apparatus according to an embodiment of the present invention will be described below.

Figure 15:
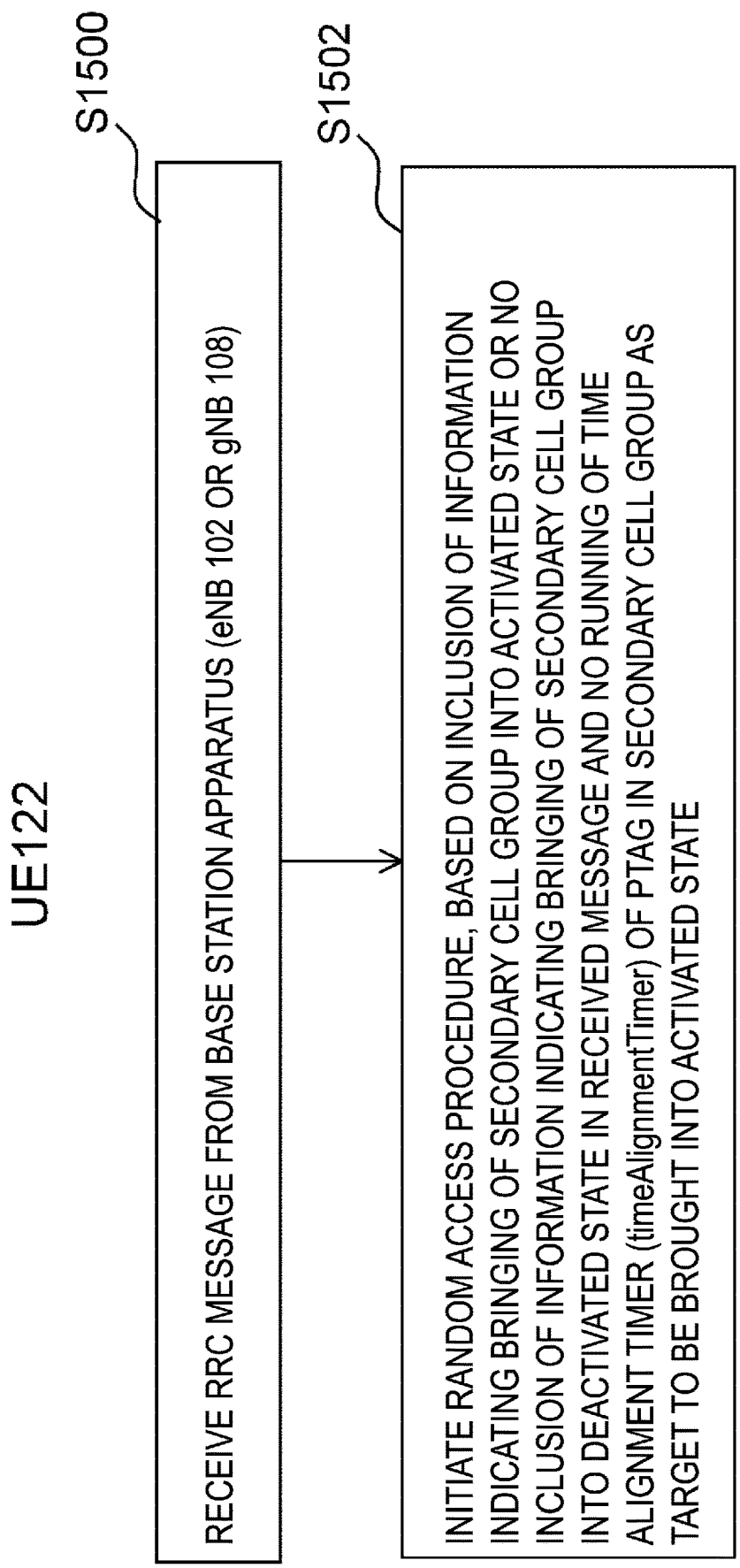
FIG. 15 is an example of processing of the terminal apparatus according to an embodiment of the present invention.

FIG. 15 is a diagram illustrating an example of processing of the terminal apparatus according to an embodiment of the present invention.

The terminal apparatus (UE 122) receives a message from the base station apparatus (the eNB 102 or the gNB 108) (Step S1500). The message may include information determining (or indicating) whether to bring the secondary cell group into the activated state or the deactivated state. The message may be an RRC message, may be a MAC control element or a message including the MAC control element, or may be other messages.

The terminal apparatus may initiate the random access procedure, based on inclusion of information indicating bringing of the secondary cell group into the activated state or no inclusion of information indicating bringing of the secondary cell group into the deactivated state in the received message, and no running of the time alignment timer (timeAlignmentTimer) of the PTAG in the secondary cell group as a target to be brought into the activated state (Step S1502). In a case that the information indicating bringing of the secondary cell group into the activated state is included in the received message or the information indicating bringing of the secondary cell group into the deactivated state is not included therein, the terminal apparatus may be arranged not to initiate the random access procedure, based on running of the time alignment timer (timeAlignmentTimer) of the PTAG in the secondary cell group as a target to be brought into the activated state.

The terminal apparatus may bring the cell group into the deactivated state, based on inclusion of information indicating bringing of the cell group into the deactivated state or no inclusion of information indicating bringing of the cell group into the activated state in the received message. The terminal apparatus may bring the cell group into the activated state, based on inclusion of the information indicating bringing of the cell group into the activated state or no inclusion of the information indicating bringing of the cell group into the deactivated state in the received message.

With this, the terminal apparatus can efficiently perform activation and deactivation of the cell group.

An example of a case in which the message is an RRC message will be described. The terminal apparatus receives an RRC message from the base station apparatus (the eNB 102 or the gNB 108). The RRC message may include information for determining whether to bring the secondary cell group into the activated state or the deactivated state.

The RRC entity of the terminal apparatus (1) indicates activation of the secondary cell group for the MAC entity, based on inclusion of the information indicating bringing of the secondary cell group into the activated state or no inclusion of the information indicating bringing of the secondary cell group into the deactivated state in the received RRC message, and (2) indicates deactivation of the secondary cell group for the MAC entity, based on inclusion of the information indicating bringing of the secondary cell group into the deactivated state or no inclusion of the information indicating bringing of the secondary cell group into the activated state in the received RRC message.

The MAC entity of the terminal apparatus may be notified of activation or deactivation of the secondary cell group from an upper layer (for example, the RRC layer) and/or another MAC entity of the terminal apparatus. Alternatively, the MAC entity of the terminal apparatus may be notified of initiation of the random access procedure for activation or deactivation of the secondary cell group from an upper layer (for example, the RRC layer) and/or another MAC entity of the terminal apparatus.

The MAC entity of the terminal apparatus may initiate the random access procedure, based on no running of the time alignment timer (timeAlignmentTimer) of the PTAG in the secondary cell group as a target of activation. The MAC entity of the terminal apparatus may be arranged not to initiate the random access procedure, based on running of the time alignment timer (timeAlignmentTimer) of the PTAG in the secondary cell group as a target of activation.

The MAC entity of the terminal apparatus may initiate the random access procedure, based on no running of the time alignment timer (timeAlignmentTimer) of the PTAG in the secondary cell group as a target of activation, and in a case that the random access procedure successfully completes, the MAC entity may notify an upper layer (RRC entity) of successful completion of random access. The MAC entity of the terminal apparatus may consider that the random access procedure has successfully completed (without performing the random access procedure), based on running of the time alignment timer (timeAlignmentTimer) of the PTAG in the secondary cell group as a target of activation, and notify an upper layer (RRC entity) of successful completion of random access.

With this, the terminal apparatus can efficiently perform activation and deactivation of the cell group by using the RRC reconfiguration message.

In the above example, the information for determining whether to bring the secondary cell group into the activated state or the deactivated state may be notified in the configuration (for example, the cell group configuration information element) of the cell group as a target. The information may be included in any one information element included in the RRC message.

The information may be information indicating whether to bring the cell group into the activated state or the deactivated state. The information may be the information indicating bringing of the cell group into the activated state. In this case, the cell group may be brought into the deactivated state, based on no inclusion of the information. The information may be the information indicating bringing of the cell group into the deactivated state. In this case, the cell group may be brought into the activated state, based on no inclusion of the information. The information may be information indicated by another information element. Note that, in a case that the information is not included in the configuration of the cell group as a target, the information may include information indicating which cell group is the target. In a case that there is one cell group (secondary cell group) that may be the target, the information need not include the information indicating which cell group is the target.

For example, the information may be a field (scgState-r17) having a value of "deactivated" of an ENUMERATED type as a value. In this case, the terminal apparatus may determine that it is the cell group to deactivate the cell group as a target based on inclusion of the field (scgState-r17) having "deactivated" as a value in the RRC message, or determine that it is the cell group to activate the cell group as a target based on no inclusion of the field in the RRC message. For example, the information may be a field (scgState-r17) having a value of "deactivated" and "activated" of an ENUMERATED type as a value. In this case, the terminal apparatus may determine that it is the cell group to deactivate the cell group as a target based on inclusion of the field (scgState-r17) having "deactivated" as a value in the RRC message, determine that it is the cell group to activate the cell group as a target based on inclusion of the field (scgState-r17) having "activated" as a value in the RRC message, or determine that the RRC message is not a message for activating and/or deactivating the cell group, based on no inclusion of the field in the RRC message.

An example of indicating whether to bring the SCG into the activated state or the deactivated state for the terminal apparatus will be described.

The terminal apparatus receives an RRC message. The RRC message may be the RRC reconfiguration message illustrated in FIG. 9, or may be another RRC message.

The RRC message may include information indicating whether to bring the SCG into the activated state or the deactivated state.

The information may be information indicating whether to bring the cell group into the activated state or the deactivated state. The information may be the information indicating bringing of the cell group into the activated state. In this case, the cell group may be brought into the deactivated state, based on no inclusion of the information. The information may be the information indicating bringing of the cell group into the deactivated state. In this case, the cell group may be brought into the activated state, based on no inclusion of the information. The information may be information indicated by another information element. Note that, in a case that the information is not included in the configuration of the cell group as a target, the information may include information indicating which cell group is the target. In a case that there is one cell group (secondary cell group) that may be the target, the information need not include the information indicating which cell group is the target. The information indicating bringing the cell group into the activated state may include an information element (rachConfigDedicated) including a parameter specific to the terminal apparatus used in the random access procedure.

In the terminal apparatus that has received the RRC message, the RRC message including the information indicating bringing of the cell group into the activated state or not including the information indicating bringing of the cell group into the deactivated state, the RRC entity of the terminal apparatus may perform a part or all of the processing of the following (A) to (E):

(A) start a first timer (here, also referred to as a timer T304X) for the SpCell of the cell group as a target. A value used for the first timer may be included in the RRC message, a value of t304 may be used, or the value may be a prescribed value;

(B) resume all of the suspended radio bearers;

(C) in a case that transmission of the SCG to all of the radio bearers is suspended, resume the transmission;

(D) indicate (or perform notification of) activation of the secondary cell group for the MAC entity of the cell group as a target;

(E) in a case that there is a notification of successful completion of the random access procedure or successful completion of activation of the secondary cell group in the MAC layer from the MAC entity of the cell group as a target, stop the first timer of the cell group.

The MAC entity of the terminal apparatus may perform the processing of the following (A) and/or (B), based on above (D):

(A) initiate the random access procedure, based on no running of the time alignment timer (timeAlignmentTimer) of the PTAG in the secondary cell group as a target of activation, and in a case that the random access procedure successfully completes, notify an upper layer (RRC entity) of successful completion of random access;

(B) consider that the random access procedure has successfully completed (without performing the random access procedure), based on running of the time alignment timer (timeAlignmentTimer) of the PTAG in the secondary cell group as a target of activation, and notify an upper layer (RRC entity) of successful completion of random access.

The expression "the random access procedure has successfully completed" may be rephrased as "activation of the secondary cell group in the MAC layer has successfully completed".

In the terminal apparatus that has received the RRC message, the RRC message including the information indicating bringing of the cell group into the activated state or not including the information indicating bringing of the cell group into the deactivated state, the RRC entity of the terminal apparatus may perform a part or all of the processing of the following (A) to (E):

(A) start a first timer (here, also referred to as a timer T304X) for the SpCell of the cell group as a target. A value used for the first timer may be included in the RRC message, a value of t304 may be used, or the value may be a prescribed value;

(B) resume all of the suspended radio bearers;

(C) in a case that transmission of the SCG to all of the radio bearers is suspended, resume the transmission;

(D) initiate the random access procedure in the SpCell of the cell group as a target;

(E) in a case that the random access procedure successfully completes in the cell group as a target, stop the first timer of the cell group.

In a case that the indication of initiation of the random access procedure is for activation of the secondary cell group, the MAC entity of the terminal apparatus may perform the processing of the following (A) and/or (B), based on above (D):

(A) initiate the random access procedure, based on no running of the time alignment timer (timeAlignmentTimer) of the PTAG in the secondary cell group as a target of activation, and in a case that the random access procedure successfully completes, notify an upper layer (RRC entity) of successful completion of the random access procedure;

(B) consider that the random access procedure has successfully completed (without performing the random access procedure), based on running of the time alignment timer (timeAlignmentTimer) of the PTAG in the secondary cell group as a target of activation, and notify an upper layer (RRC entity) of successful completion of random access procedure.

In the terminal apparatus that has received the RRC message, the RRC message including the information indicating bringing of the cell group into the deactivated state or not including the information indicating bringing of the cell group into the activated state, the RRC entity of the terminal apparatus may perform a part or all of the following (A) to (D):

(A) in a case that a second timer (here, also referred to as a timer T304X) for the SpCell of the cell group as a target is running, stop the second timer;

(B) suspend a part of the radio bearers (for example, SRB3);

(C) suspend transmission of the SCG to all of the radio bearers;

(D) notify the MAC entity of the cell group as a target that the cell group has entered the deactivated state.

The terminal apparatus may stop the first timer of the SCG, based on release of the SCG and/or entering of the SCG into the deactivated state.

Operation of the terminal apparatus in a case that the first timer has expired will be described.

In a case that the first timer of the secondary cell group expires, the RRC entity of the terminal apparatus performs the following processing (A) in a case that MCG transmission is not suspended, and performs the following processing (B) in a case that MCG transmission is suspended:

(A) in a case that a preamble specific to the terminal apparatus provided by rach-ConfigDedicated is configured, release the preamble, and in order to report the failure of SCG reconfiguration with synchronization, initiate a procedure for SCG failure information;

(B) initiate the RRC connection reestablishment procedure.

With this, the terminal apparatus can efficiently perform activation and deactivation of the cell group by using the RRC message.

An example of the above embodiment will be described. A terminal apparatus that communicates with a base station apparatus may include: a receiver that receives a first RRC message including a parameter related to a first cell group from the base station apparatus; a processing unit that processes the first RRC message; and a transmitter that transmits a random access preamble in an SpCell of the first cell group, based on reception of the first RRC message. The processing unit may perform transmission of the random access preamble in the SpCell, based on first information being included in the first RRC message and a time alignment timer of a PTAG of the first cell group which is not running.

The first cell group may be the secondary cell. The first information may be information indicating activation of the first cell group. In a case that the first information is not included, activation of the first cell group may be indicated.

The first RRC message may be the RRC reconfiguration message, or may be another RRC message. The first RRC message may be a message transmitted from a cell of the master cell group. The first RRC message may be an RRC message generated by the secondary node included in a form of a container in the RRC message generated by the master node.

The RRC entity of the terminal apparatus may notify the MAC entity of information of activation or deactivation of the secondary cell group, and the MAC entity may thereby perform the random access procedure in order to establish uplink synchronization in a necessary case.

The RRC entity of the terminal apparatus may indicate performing of the random access procedure for the MAC entity, and the MAC entity may thereby perform the random access procedure in order to establish uplink synchronization in a necessary case.

The RRC entity of the terminal apparatus may submit a response message for the first RRC message to the MAC entity of the secondary cell group, and thereby cause the MAC entity to perform a procedure necessary for uplink transmission. The MAC entity may perform the random access procedure for a scheduling request in a necessary case.

The RRC entity of the terminal apparatus that deactivates the SCG may perform a part or all of the following (A) to (E):

(A) suspend SCG transmission for all of the SRBs and the DRBs;

(B) reset the SCG MAC;

(C) in a case that the first timer in the SCG is running, stop the first timer;

(D) in a case that a conditional reconfiguration for PSCell change is configured, stop the evaluation;

(E) submit a message indicating completion of deactivation to a lower layer for transmission.

The RRC entity of the terminal apparatus that activates the SCG may perform a part or all of the following (A) to (D):

(A) resume SCG transmission for all of the SRBs and the DRBs;

(B) reset the SCG MAC;

(C) in a case that a conditional reconfiguration for PSCell change is configured, start (or restart) the evaluation;

(D) submit a message indicating completion of activation to a lower layer for transmission.

Regarding an expression "information indicating bringing the cell group into the deactivated state is included", information directly indicating bringing the cell group into the deactivated state for the terminal apparatus need not be included. For example, the expression "information indicating bringing the cell group into the deactivated state is included" may simply mean that the first information is included, or may mean that the second information is not included. The terminal apparatus may perform the above processing, based on inclusion of the first information or no inclusion of the second information. Similarly, regarding an expression "information indicating bringing the cell group into the activated state is included", information directly indicating bringing the cell group into the activated state for the terminal apparatus need not be included. For example, the expression "information indicating bringing the cell group into the activated state is included" may simply mean that the second information is included, or may mean that the first information is not included. The terminal apparatus may perform the above processing, based on inclusion of the second information or no inclusion of the first information.

The expression "information indicating bringing the cell group into the deactivated state is included" may include no inclusion of the information indicating bringing the cell group into the activated state. Similarly, the expression "information indicating bringing the cell group into the activated state is included" may include no inclusion of the information indicating bringing the cell group into the deactivated state.

Activation (deactivation) of the cell group and activation (deactivation) of the SpCell of the cell group may be replaced with each other. Similarly, bringing the cell group into the activated state (deactivated state) and bringing the SpCell of the cell group into the activated state (deactivated state) may be replaced with each other.

In a case that the secondary cell group is deactivated, the MAC entity of the terminal apparatus may be arranged not to stop the time alignment timer of the PTAG of the cell group. In a case that the secondary cell group is activated, the MAC entity of the terminal apparatus may initiate the random access procedure, based on no running of the time alignment timer of the PTAG of the cell group. The MAC entity of the terminal apparatus may notify an upper layer (RRC entity) of information allowing determination of expiry of the time alignment timer, based on deactivation of the secondary cell group and expiry of the time alignment timer of the PTAG of the cell group. The RRC entity of the terminal apparatus may be arranged not to perform radio link monitoring, based on reception of a notification of the information allowing determination of expiry of the time alignment timer from the MAC entity of the deactivated secondary cell group. The MAC entity of the terminal apparatus may be arranged not to perform detection and/or recovery of a beam failure in a cell of the secondary cell group, based on expiry of the time alignment timer of the PTAG of the deactivated secondary cell group. The MAC entity of the terminal apparatus need not stop the time alignment timer, based on deactivation of the cell group. For example, the MAC entity of the terminal apparatus need not stop the time alignment timer (time alignment timer of the PTAG) associated with the TAG including the SpCell of the deactivated cell group and the time alignment timers of other STAGs of the deactivated cell group, based on deactivation of the cell group. Alternatively, for example, the MAC entity of the terminal apparatus need not stop the time alignment timer (time alignment timer of the PTAG) associated with the TAG including the SpCell of the deactivated cell group, based on deactivation of the cell group, and may stop the time alignment timers of other STAGs of the deactivated cell group, based on deactivation of the cell group.

The radio bearer(s) in the above description may be the DRB, may be the SRB, or may be the DRB and the SRB.

In the above description, expressions such as "link", "map", and "associate" may be replaced with each other.

In the above description, "the" may be replaced with "above-described".

In the above description, the "SpCell of the SCG" may be replaced with the "PSCell".

In the above description, the "dormant state" may be replaced with the "deactivated state", and the "state resumed from the dormant state" may be replaced with the "activated state". In the above description, "activate" and "deactivate" may be replaced with the "activated state" and the "deactivated state", respectively.

In the above description, "transition from X to Y" may be replaced with "change from X to Y". The "activated BW P" may be replaced with the "Active BWP".

In the example of each processing or the example of the flow of each processing in the above description, a part or all of the steps need not be performed. In the example of each processing or the example of the flow of each processing in the above description, order of the steps may be different from each other. In the example of each processing or the example of the flow of each processing in the above description, a part or all of the processing in each step need not be performed. In the example of each processing or the example of the flow of each processing in the above description, order of processing in each step may be different from each other. In the above description, "to perform B based on satisfaction of A" may be replaced with "to perform B". In other words, "to perform B" may be performed independently of "satisfaction of A".

Note that in the above description, "A may be interpreted as B" may include the meaning that B is interpreted as A in addition to interpretation of A as B. In a case that the above description contains "C may be D" and "C may be E," this means inclusion of "D may be E." In a case that the above description contains "F may be G" and "G may be H," this means inclusion of "F may be H."

In the above description, in a case that a condition "A" and a condition "B" are conflicting conditions, the condition "B" may be expressed as "other" condition of the condition "A".

Various aspects of the terminal apparatus according to embodiments of the present invention will be described below.

(1) A first aspect of the present invention is a terminal apparatus for communicating with a base station apparatus. The terminal apparatus includes a receiver configured to receive a first RRC message including a parameter related to a first cell group from the base station apparatus, a processing unit, and a transmitter configured to transmit a random access preamble in an SpCell of the first cell group, based on reception of the first RRC message. The processing unit transmits the random access preamble in the SpCell, based on first information being included in the first RRC message and a time alignment timer, in a primary TA group of the first cell group, which is not running.

(2) A second aspect of the present invention is a base station apparatus for communicating with a terminal apparatus. The base station apparatus includes a transmitter configured to transmit a first RRC message including a parameter related to a first cell group to the terminal apparatus; and a receiver configured to receive a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

(3) A third aspect of the present invention is a method applied to a terminal apparatus for communicating with a base station apparatus. The method includes the steps of: receiving a first RRC message including a parameter related to a first cell group from the base station apparatus; and transmitting a random access preamble in an SpCell of the first cell group, based on reception of the first RRC message. The random access preamble is transmitted in the SpCell, based on first information being included in the first RRC message and a time alignment timer, in a primary TA group of the first cell group, which is not running.

(4) A fourth aspect of the present invention is a method applied to a base station apparatus for communicating with a terminal apparatus. The method includes the steps of: transmitting a first RRC message including a parameter related to a first cell group to the terminal apparatus; and receiving a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

(5) A fifth aspect of the present invention is an integrated circuit implemented in a terminal apparatus for communicating with a base station apparatus. The integrated circuit is configured to cause the terminal apparatus to exert: a function of receiving a first RRC message including a parameter related to a first cell group from the base station apparatus; and a function of transmitting a random access preamble in an SpCell of the first cell group, based on reception of the first RRC message. The random access preamble is transmitted in the SpCell, based on first information being included in the first RRC message and a time alignment timer, in a primary TA group of the first cell group, which is not running.

(6) A sixth aspect of the present invention is an integrated circuit implemented in a base station apparatus for communicating with a terminal apparatus. The integrated circuit is configured to cause the base station apparatus to exert: a function of transmitting a first RRC message including a parameter related to a first cell group to the terminal apparatus; and a function of receiving a random access preamble transmitted in the SpCell from the terminal apparatus, based on the first RRC message. The terminal apparatus is caused to determine whether or not to perform transmission of the random access preamble in the SpCell, based on whether or not first information is to be included in the first RRC message and whether or not a time alignment timer of a primary TA group is running.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiment may be partially enabled by a computer. In such a case, a program for implementing such control functions may be recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that, the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB

104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus comprising:
processing circuitry configured to communicate by using a Master Cell Group (MCG) and a Secondary Cell Group (SCG); and
a receiver configured to receive a Radio Resource Control (RRC) message, wherein
the processing circuitry is configured to initiate a random access procedure in a Special Cell (SpCell) in the SCG based on, at least, that information indicating transitioning the SCG into a deactivated state is not included in the RRC message, that a time alignment timer of a primary Time Alignment (TA) group of the SCG is not running.

2. A method performed by a terminal apparatus for communicating with a base station apparatus, the method comprising:
communicating by using a Master Cell Group (MCG) and a Secondary Cell Group (SCG);
receiving a Radio Resource Control (RRC) message; and
initiating a random access procedure in a Special Cell (SpCell) in the SCG based on, at least, that information indicating transitioning the SCG into a deactivated state is not included in the RRC message, and that a time alignment timer of a primary Time Alignment (TA) group of the SCG is not running.

* * * * *